United States Patent [19]

Macker et al.

[11] 3,728,693

[45] Apr. 17, 1973

[54] PROGRAMMATICALLY CONTROLLED INTERRUPT SYSTEM FOR CONTROLLING INPUT/OUTPUT OPERATIONS IN A DIGITAL COMPUTER

[75] Inventors: John Arthur Macker; William Francis Keenan, both of Goleta, Calif.

[73] Assignee: Burroughs Corporation, Detroit, Mich.

[22] Filed: Apr. 28, 1972

[21] Appl. No.: 248,500

[52] U.S. Cl. .......... 340/172.5

[51] Int. Cl. .......... G06f 3/00

[58] Field of Search .......... 340/172.5

[56] References Cited

UNITED STATES PATENTS

| | | | |
|---|---|---|---|
| 3,411,143 | 11/1968 | Beausoleil et al. | 340/172.5 |
| 3,588,831 | 6/1971 | Figueroa et al | 340/172.5 |

*Primary Examiner*—Raulfe B. Zache

*Attorney*—Robert L. Parker et al.

[57] ABSTRACT

A digital computer system in which each input/output operation for transferring data between main memory and any one of a plurality of peripheral devices is initiated by a processor executing a Dispatch operation through an exchange associated with the main memory. In response to a Dispatch operation a designated input/output control unit examines a Result Status field of an associated input/output descriptor stored in main memory. The Result Status field defined by the descriptor indicates the current status of the input/output operation, namely, whether it has been completed or not. If not completed, the control unit performs the operation defined by the descriptor. When the input/output operation defined by the descriptor is completed, the Result Status field of the descriptor is again read out of main memory to the control unit and a new Result Status field written into the same location in memory, the new Result Status field indicating the operation has been completed and indicating whether or not there has been an exception condition, errors, etc. The control unit examines the prior Result Status field received from memory to determine if an interrupt of the processor is indicated. Only if an interrupt condition has been set in the prior Result Status field by the processor, the control unit initiates a Dispatch operation to the processor, signaling the processor that the operation is completed. If the interrupt condition is not set or if the interrupt condition has been set after the Dispatch operation is initiated, the control unit reads out a link address from the descriptor, and using the link address, reads out the Result Status field of another descriptor from memory. If the Result Status field of a descriptor, when first examined, indicates that the input/output descriptor has already been completed, the control unit continues to inspect the Result Status field at timed intervals until the Operation Complete condition is reset, in which case the input/output descriptor operation is again executed by the control unit.

23 Claims, 23 Drawing Figures

| | RQ-4 | RQ-3 | RQ-2 | RQ-1 | |
|---|---|---|---|---|---|
| NORMAL | 0 | 0 | 0 | 0 | NO OPERATION (IDLE) |
| | 1 | 0 | 0 | 0 | READ |
| | 1 | 0 | 0 | 1 | WRITE |
| | 1 | 0 | 1 | 0 | SWAP |
| DISP. | 1 | 1 | 0 | 1 | DISPATCH WRITE |
| | 1 | 1 | 0 | 0 | DISPATCH READ & CLEAR |

PROGRAMMATICALLY CONTROLLED INTERRUPT SYSTEM FOR CONTROLLING INPUT/OUTPUT OPERATIONS IN A DIGITAL COMPUTER

FIELD OF THE INVENTION

This invention relates to digital computing systems, and more particularly, is concerned with controlling transfer of data between a plurality of peripheral devices and the main memory of a computer system.

BACKGROUND OF THE INVENTION

Digital computer systems typically comprise one or more processors, a main memory, and a plurality of peripheral devices, frequently referred to as input/output or I/O units, such as card readers, magnetic tape units, printers, disk files, and the like. Operation of the peripheral devices is handled by independent control units, freeing the processors to process active data already in the main memory. By having separate input/output controls it is possible to have concurrent processing and input/output operations within the same program, and coordinate and synchronize the concurrent operations. To accomplish this, the program, which must operate through one of the processors, must initiate all input/output operations and must have some means of determining when the input/output operations are completed. For example, if a program calls for a file of data to be loaded into the main memory, it must be able to determine when that operation has been completed before it can use the data. An input/output operation is initiated by the program by some type of Initiate instruction which provides an address pointing to an input/output descriptor stored in main memory. The descriptor identifies the peripheral device, the type of operation, such as a Read or Write, and the field in memory to be used in the input/output operation. This descriptor is transferred to the input/output control unit to control the transfer of data between the peripheral device and main memory.

When the input/output operation is complete, some type of completion statement, referred to as a Result descriptor, is transferred from the control unit to some location in main memory known to the program. Typically the Result descriptor includes information identifying the peripheral device and information as to the result of the input/output operation; for example, whether any exception conditions occurred, whether any error conditions occurred, or any other condition occurred peculiar to the particular peripheral device.

Once an input/output operation is initiated by a program, the program must be able to determine when the input/output operation is complete. One technique is for the program to interrogate the Result descriptors periodically to determine when particular input/output operations have been completed. It is much more convenient if the input/output control indicates when the operation is finished. To accomplish this, it is usually necessary to interrupt whatever operation the processor has underway and force it to examine the Result descriptor and take appropriate action. This is known as an Interrupt.

When an Interrupt occurs, the processor must stop the program it is currently executing, it must store the contents of a number of registers and control flip-flops so that it can return to the same point in the program it is currently executing and then it must transfer operation to a program designed to service the Interrupt condition. The program for servicing Interrupt conditions, sometimes referred to as a Master Control Program or MCP, must keep record of current input/output operations and associate the Interrupt with the input/output operation that caused it. It must analyze the results to see if any exceptions occurred or if an error condition was reported and take appropriate action. It must make the results of the input/output operation available to the program that initiated the input/output operation and determine if other input/output operations are waiting to be initiated and, if so, take action to initiate another input/output operation.

BRIEF DESCRIPTION OF THE INVENTION

The present invention is directed to an improved system for handling input/output operations which provides more efficient and simplified control of input/output operations. Each input/output operation involves a single descriptor which is used for both initiating an input/output operation and storing the completion statement generated at the termination of the input/output operation. This descriptor can be placed anywhere in memory under programmatic control rather than being assigned fixed locations in memory. The completion statement also includes the address in memory where the last unit of information transferred by the input/output operation was stored. In the past, either a fixed space in memory was defined without any allowed variables, a final address was retained in the control unit which could only be interrogated by a separate operation, or special delimiter characters were stored with the transferred information to define the end of the data field. By storing the final address as part of the descriptor, the use of memory space can be more efficiently and simply controlled.

Another feature of the present invention is that an interrupt on completion of the input/output operation is optional to the program. A program can request or not request an interrupt of the processor at the completion of the input/output operation. The option can be exercised at any time up until the time the input/output operation is terminated and the completion statement is returned to the descriptor in memory. This is accomplished by including a flag bit embedded in the descriptor, called an Interrupt Request bit. This bit is examined by the input/output control unit at the time it stores the completion statement in the descriptor. Only if this bit is on does the control unit signal the processor to initiate an interrupt condition. At the same time, only if the Interrupt Request bit is on, the control unit sends the processor the address of the descriptor and identifies itself as the source of the interrupt.

A further feature of the input/output control system of the present invention is the ability to execute a number of input/output operations in sequence without program intervention. In the past, when an input/output operation was completed, the next input/output operation had to be initiated by the program. Some systems permitted the descriptor to define a multiple number of consecutive input/output operations. "Chaining" of descriptors has also been employed in a restrictive sense in which, on completion of one input/output operation, a new descriptor could be executed automatically by storing the descriptors contiguously in memory. Operation would cease with the last descriptor in the string. The chaining operation was limited to a single peripheral device.

In the system of the present invention, the chain of descriptors is programmatically linked together and need not be in contiguous locations. The chain can be "looped" so as to form an endless chain. The operation will pause at any point in the chain when a descriptor is encountered that is not ready to be executed. The descriptor is retested periodically until it is ready to be executed, as indicated by a flag bit, referred to as an Operation Complete bit, embedded in the descriptor. The chaining of input/output operations takes place whether or not the Interrupt Request bit is set. The next descriptor in the chain is executed by the input/output control after an Interrupt Request is signaled to the processor if the Interrupt Request bit has been set. The chaining of descriptors is only stopped if a Stop operation is called by a descriptor in the chain or if some exception condition is flagged by the peripheral device.

It is possible for several input/output control units which control several peripheral devices through an exchange, for example, to share a common chain of linked descriptors, selecting only those descriptors controlling input/output operations that have not been completed. New descriptors or modifications of the descriptors without regard to which descriptor is currently being executed is possible. The chain can be altered programmatically while being used for executing input/output operations.

BRIEF DESCRIPTION OF THE DRAWINGS

For a more complete understanding of the invention, reference should be made to the accompanying drawings, wherein.

DETAILED DESCRIPTION

Figure 1:
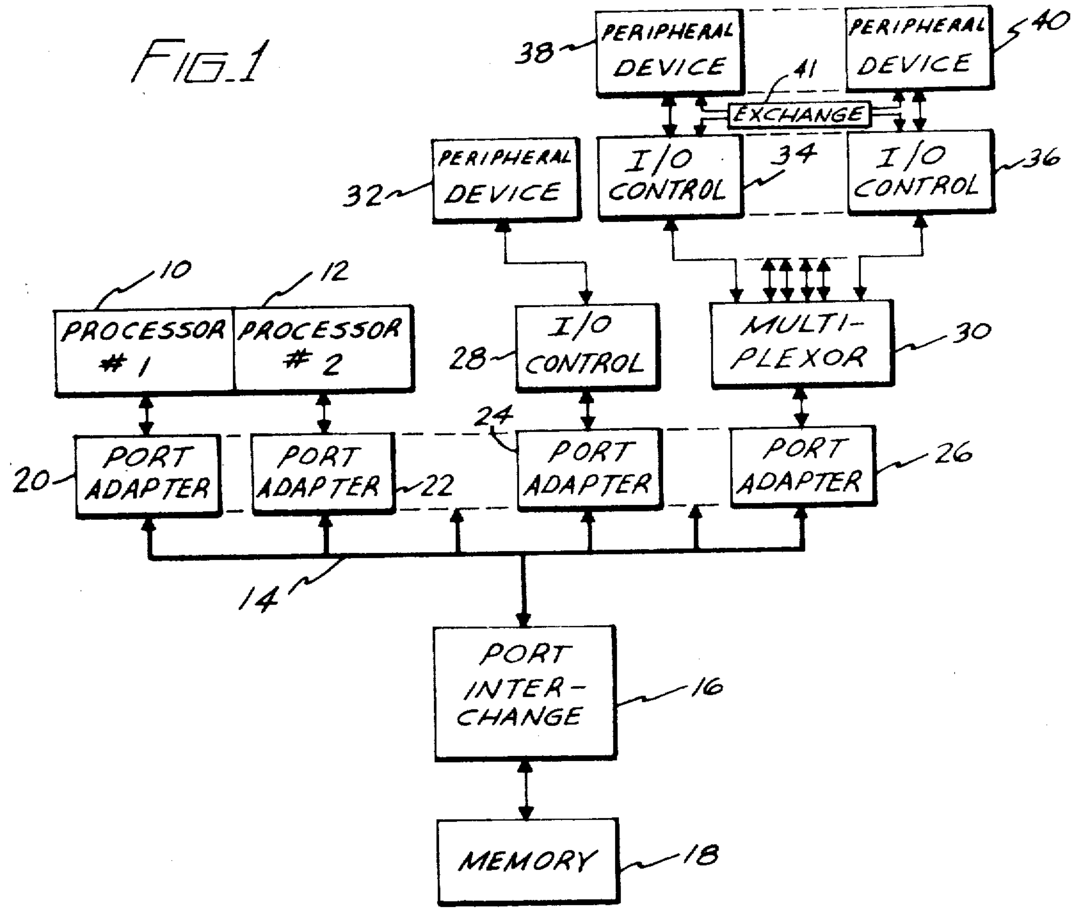
FIG. 1 is a block diagram of a computer system of the type incorporated in the present invention.

Referring to FIG. 1, there is shown a block diagram of the computer system in which one or more processors, such as indicated at 10 and 12, are connected through a common bus 14 to a port interchange 16, the port interchange controlling accesses to a main memory 18. The processors are connected through port adaptors 20 and 22, respectively, which provide an interface between the processors and the bus 14. The bus 14 is shown as having a plurality of ports, six being shown by way of example in FIG. 1. In addition to the two port adaptors 20 and 22, two additional port adaptors are shown at 24 and 26 which interface respectively between the common bus 14 and an input/output control unit 28 and a multiplexor 30. The input/output control device 28 in turn is connected to a peripheral device 32 while the multiplexor 30 may have a plurality of output channels, each of which is connected to a peripheral device through an associated input/output control unit. Only two of the channels are shown in FIG. 1 as going to input/output control units 34 and 36 which control respectively peripheral devices 38 and 40.

The system is designed such that the interface between the port adaptors and the associated port devices, whether they be processors, input/output control units, or multiplexors, are identical. Thus any combination of port devices up to the total number of ports available on the bus may be provided in the system. Any port device can initiate a memory cycle for reading, writing, or exchanging information between the port device and the main memory 18 through the port interchange 16. In addition, any port device can communicate with any other port device through the port interchange by initiating a Dispatch operation. The dispatch operation may involve either a memory Read or a memory Write operation. In a dispatch Write operation the port device stores an address in memory at a predetermined location, such as address 00, and stores control information including identification of the destination port in a digital control register. The port interchange 16, in response to a Dispatch operation from a port device, signals the destination port device that there is a dispatch present. The destination port device then does a memory Read cycle in location 00 in main memory, obtaining the address and at the same time reads out the control information stored in the dispatch control register in the port interchange 16, thus completing transfer of the dispatch message from one port device to another.

Assuming, as shown in FIG. 1, that at least one of the port devices is a processor and another of the port devices is an input/output control unit with its associated peripheral device, this Dispatch operation can be effectively used to initiate an input/output operation by the input/output control unit for transferring data between the peripheral device and the main memory. To initiate an input/output operation, the processor 10, which preferably is a micro-program processor such as is described in copending application Ser. No. 157,297 filed June 28, 1971, and assigned to the same assignee as the present application, executes a Dispatch Write micro-operator. The Dispatch Write micro-operator causes an address to be transferred from the processor and stored in location 00 in the main memory. At the same time the processor transfers to the Dispatch control register in the port interchange 16, information identifying the destination port of the dispatch and, if the port device is a multiplexor, the channel number of the multiplexor channel going to the particular input/output control unit to be used in the input/output operation being initiated.

Figure 2:
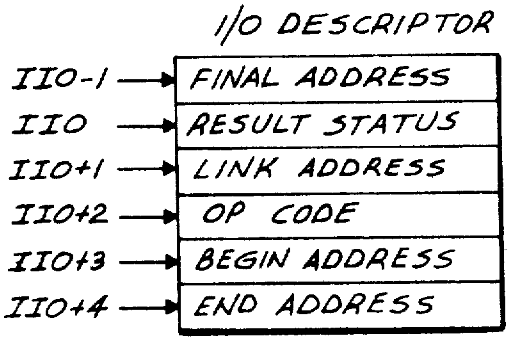
FIG. 2 is a diagram showing the format of an input/output descriptor.

The address stored in memory location 00 by the processor points to an input/output descriptor stored in main memory 18. The format of the descriptor is shown in FIG. 2. The descriptor contains at least six separately addressable fields. The first field is for storing the final address location in memory at the completion of the input/output operation. Initially this field would be zero and would not be set until the completion of the execution of the input/output operation defined by the descriptor. The second field in the descriptor is the Result Status field. This is followed by the link address field which contains a link address pointing to the Result Status field of the next input/output descriptor in the linked chain of input/output descriptors. The next field is the operation code (OP) field which specifies the input/output operation to be performed, such as to read in information from the peripheral device to memory or to write information into the peripheral device from memory. The remaining two fields define the beginning address and the ending address of the buffer area in memory set aside for use in the execution of the input/output operation defined by the descriptor.

Figure 3:
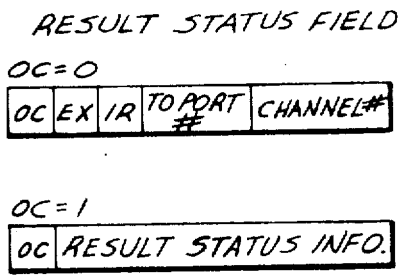
FIG. 3 is a diagram showing the format of the Result Status field.

The contents of the Result Status field are shown in FIG. 3. The content of the Result Status field changes since it is used to store the Result Status information at the completion of the input/output operation and also used to store control information prior to the completion of the operation. The most significant bit in the Result Status field is referred to as the OC (Operation Complete) bit. This bit is initially 0 and is set to 1 by the input/output control unit at the time it sets the rest of the Result Status field to signal the result of the operation. Initially with the OC bit equal 0, the Result Status field includes an IR (Interrupt Request) bit which is used to signal the input/output control unit whether or not an Interrupt is requested by the processor. The Result Status field includes the number of the port to which the Interrupt is to be sent, referred to as the To Port No. In addition there may be a channel number specified, if necessary.

Figure 4:
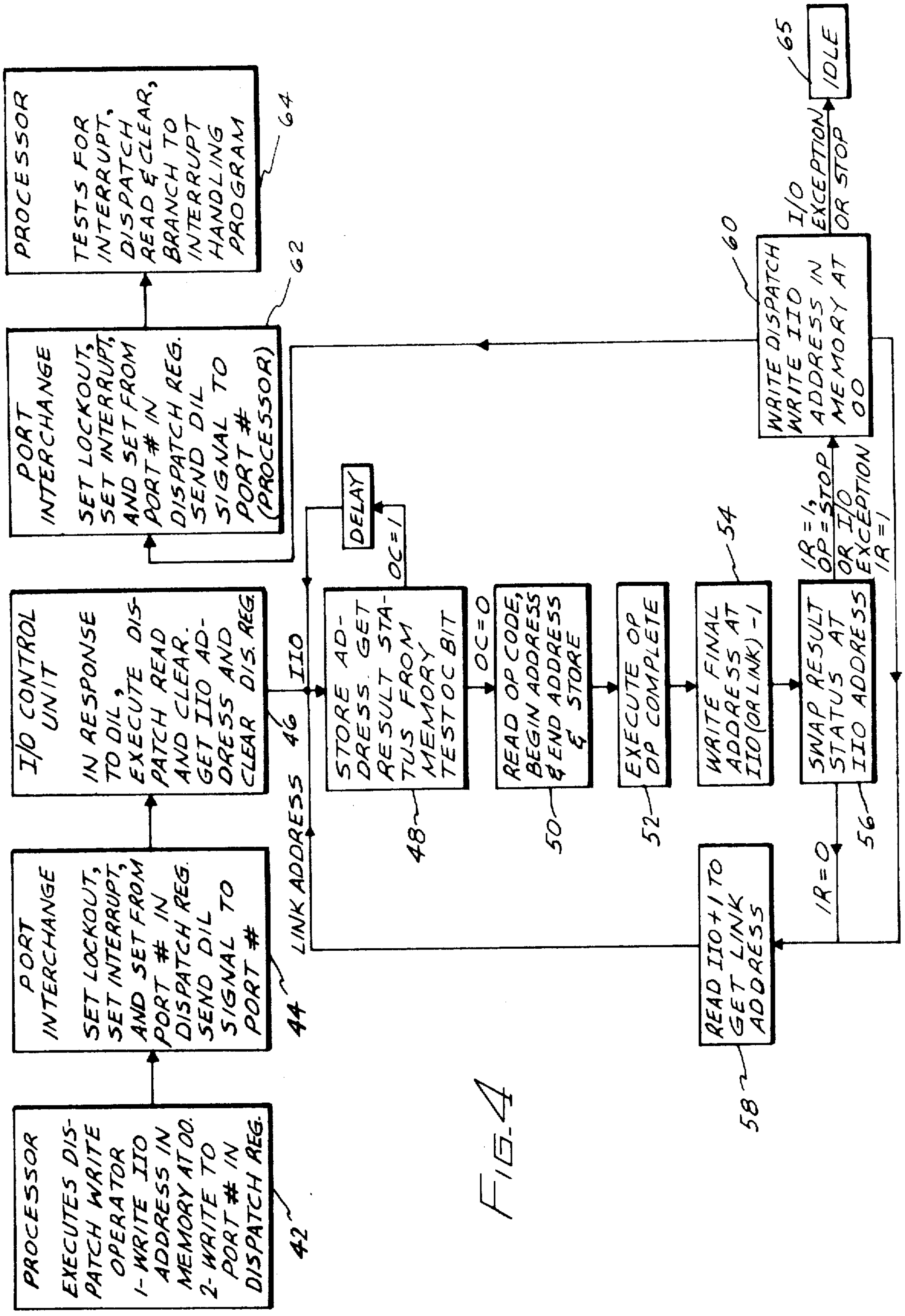
FIG. 4 is a flow diagram showing the operation of the computer in controlling input/output operations.

Referring to FIG. 4, there is shown a block diagram outlining the major steps the system goes through in initiating an input/output operation. As indicated at 42, the processor 10, after the appropriate input/output descriptors have been loaded in memory, when an input/output operation is needed by a program being executed, initiates a Dispatch Write operator. The Dispatch Write operator initiates a memory cycle in which the address of a descriptor stored in memory, referred to as the IIO address, is transferred into main memory at memory location 00. This location in memory is reserved for transfer of dispatch messages between ports. In executing the Dispatch Write operator, the processor also transfers control information to a Dispatch register in the port interchange 16 identifying the port number and channel number, if applicable, to which the dispatch is directed.

Figure 5:
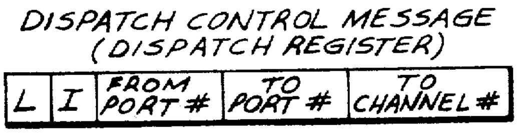
FIG. 5 is a diagram showing the contents of the Dispatch register.

In response to the Dispatch Write operation initiated by the processor, the port interchange, as indicated by block 44 in FIG. 4, sets a Lockout bit L in the Dispatch register, sets an Interrupt bit I in the Dispatch register, and sets a From Port No. in the Dispatch register. The format of the contents of the Dispatch register is shown in FIG. 5. As shown in FIG. 5, the most significant bit is the Lockout bit L followed by the Interrupt bit I, the From Port No., the To Port No., and the Channel No. The function of the Lockout bit is to signal all the port devices that a Dispatch operation has been initiated and that no other port device can initiate a Dispatch operation until the Lockout bit is reset. The port interchange, in response to the Interrupt bit and the To Port No., provides a Dispatch Interrupt Level (DIL) on the bus 14, signaling the particular port device that a Dispatch has been directed to it.

Assuming that the port device is an input/output control unit, such as the input/output control unit 28 in FIG. 1, the input/output control unit then executes a Dispatch Read and Clear operation. (See block 46 in FIG. 4). The Dispatch Read and Clear causes the IIO address to be read out of memory location 00 to the input/output control unit. At the same time it clears the Dispatch register, turning off the Lockout bit so as to permit other dispatch operations to be initiated by any of the port devices.

Having received the II0 address, the input/output control unit, as indicated by block 48, initiates a Read memory cycle from the II0 address in main memory. Since the IIO address points to the Result Status field of the descriptor, the Result Status field is transferred by the memory Read operation to the input/output control unit. A test is then made on the OC bit to determine whether it is 0 or 1.

If the OC bit is 1, indicating that the descriptor has already been executed, the input/output control unit delays for some fixed period of time and then again reads out the Result Status field of the descriptor from memory, again testing the OC bit. The OC bit in the descriptor in memory is turned off by the software of the system after it has determined that the buffer area in memory defined by the Begin and End addresses of the descriptor is available for an input/output operation.

If the OC bit has been turned off in the descriptor, the input/output control 28 proceeds to read out the OP code field, the Begin Address field, and the End Address field of the descriptor, storing them in the input/output control unit. (See block 50 of FIG. 4). Once this has been done, the input/output control unit proceeds to execute the operation specified by the OP code, which typically is an instruction to transfer data from the associated peripheral device into main memory, or to transfer the data from main memory back into the peripheral device. (See block 50 at FIG. 4)

When the operation is completed, the input/output control unit writes the final address of memory used in the transfer operation and stores it in main memory in the final address field of the descriptor, as indicated by block 54 of FIG. 4. The input-output control unit then does a memory swap operation on the Result Status field of the descriptor in which the old Result Status field in which the OC bit was off is again read out of memory into the input/output control unit while a new Result Status field is stored back in the Result Status field of the descriptor in main memory.

At this point, the input/output control unit examines the Interrupt Request bit in the old Result Status field read out of memory to determine if it is 0 or 1. If the Interrupt Request (IR) bit is 0, no interrupt of the processor is required. The input/output control unit proceeds to do a memory Read operation on the Link Address field of the descriptor, getting an address pointing to the next input/output descriptor in the chain. As shown by the flow diagram in FIG. 4, once the Link Address is obtained the input/output control unit reenters the operation indicated in block 48 in which the Result Status field is read out of the new descriptor stored at the Link Address location in main memory.

If the memory swap operation, indicated at block 56 in FIG. 4, indicates that the Interrupt Request bit in the old Result Status field is 1, providing for an Interrupt, or if the OP code is a Stop command, or if an exception condition has developed during the input/output operation, the input/output control unit initiates an Interrupt by executing a Write Dispatch operation, as indicated in block 60. The Write Dispatch operation is the same as described above in connection with the operation of the processor in block 42. It causes the address of the Result Status field of the descriptor to be stored in memory location 00 and it causes the To Port No. derived from the Result Status field to be stored in the Dispatch register of the port interchange 16.

As noted in block 62 of FIG. 4, the port interchange 16 operates exactly as described in block 44, namely, it sets the Lockout bit, the Interrupt bit, and the From Port No. in the Dispatch register and sends a Dispatch Interrupt Level (DIL) to the designated port device, which normally would be a processor. The processor, in response to the interrupt condition, tests for the interrupt condition and branches to an interrupt handling program in the usual manner, as indicated by block 64.

In the event the Write Dispatch operation in block 60 was initiated as the result of an Interrupt Request, the input/output control unit then reads out the Link Address for the next descriptor. However, if the Write Dispatch was the result of a Stop Command or an input/output exception condition, the input/output control unit returns to an Idle state, as indicated by block 65.

Figures 6, 7:
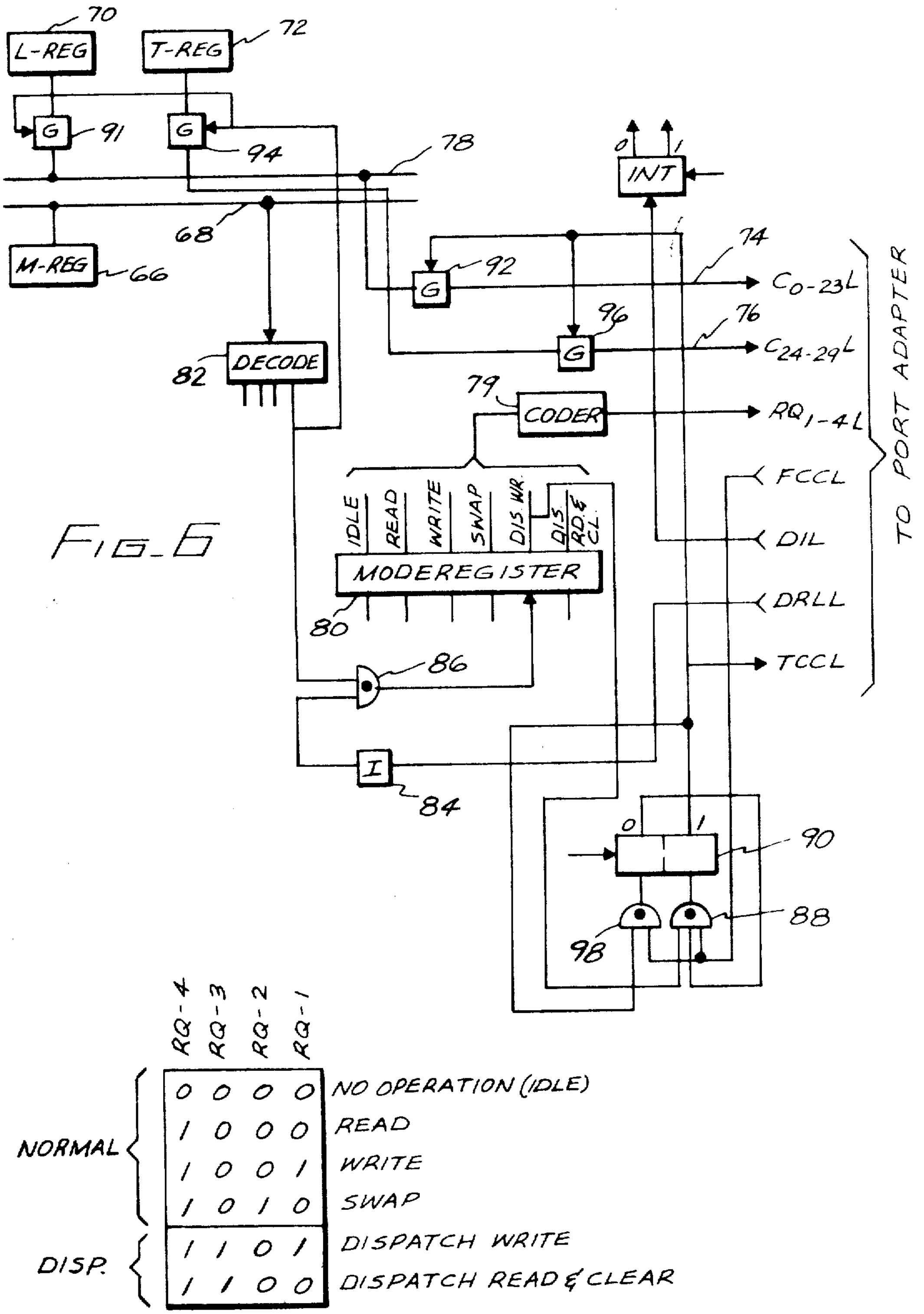
FIG. 6 is a schematic block diagram of a portion of the processor.
FIG. 7 is a truth table showing binary coding for various modes of operation.

Considering the operation and construction of the computing system, FIG. 6 shows schematically a portion of the processor including the port interface. As described in more detail in the above-identified patent application, the processor is micro-programmed by strings of micro-operators that are fetched in sequence into an M-register 66. The contents of the M-register 66 are applied to a control bus 68 for controlling the logic in the processor in response to the particular micro-operator stored in the M-register 66. When the Write Dispatch micro-operator is encountered in the M-register 66, an L-register 70 will already have been loaded by the micro-program string with the IIO address pointing to the I/O descriptor in main memory and, more specifically, pointing to the Result Status field in that I/O descriptor. Also a T-register 72 will already have been loaded with the designation of a port number and, if required, a channel number. The port adapter to port device interface includes an address and data bus 74, which normally consists of 24 lines, designated $C_{0-23}$ L. It further includes a control bus 76 which may, for example, consists of six lines, designated $C_{24-29}$L. These lines are used to transfer port and channel designation information between the port device and the port interchange. There are four memory request lines, designated $RQ_{1-4}$L, which are used to initiate a Memory Request cycle and to designate the mode of operation, namely a memory Read, a memory Write, a memory Swap, a Dispatch Write, or a Dispatch Read and Clear. The request lines direct signals to the port interchange from a coder 79 connected to the output of a Mode register 80. The Mode register 80 is set from the Idle state to any one of the memory control states in response to the type of micro-operator being executed. FIG. 7 shows a truth table for the coder 79 for the various conditions of the Mode register 80.

Assuming that the M-register 66 contains a Dispatch Write, the Mode register 80 is set to the Dispatch Write state by the output of a decoder 82 connected to the M-register 66 through the control bus 68. Before a Dispatch Write operation can be initiated, the port interchange must be free to receive a new dispatch operation. This is controlled by a Dispatch Register Lock signal (DRLL) from the port interchange. If this level is off, it means that the Lock bit in the Dispatch register has not been turned on and therefore the port interchange is free to accept a Dispatch operation. The DRLL level is applied through an inverter 84 to the input of an AND circuit 86 together with the output of the decoder 82. The output of the AND circuit 86 is applied to the Mode register to set it to the Dispatch Write mode.

In any memory cycle, the port device first sends a memory address over the data bus 74 to the port interchange. The data bus is then used to receive, send, or swap 24 bits of data with main memory. In a Dispatch Write operation, the processor does a memory Write operation in which the IIO address in the L-register 70 is transferred over the data bus 74 into memory location 00 of main memory 18. Therefore after the Mode register 80 is set to the Dispatch Write mode, the processor initially sends the required address over the data bus 74. Since in the case of the Dispatch Write this address is 00, no information need be applied to the data bus 74. The request lines $RQ_{1-4}$L cause the port interchange to accept the address on the data bus 74, in a manner hereinafter described in detail. After the address is accepted, the port interchange returns a communication control level, designated FCCL. This level, when true, indicates that an address is accepted or that Write data has been accepted, or that Read data is present in the port interchange. The FCCL level in the processor is applied to an AND circuit 88 together with the Dispatch Write level from the output of the Mode register 80. When FCCL first goes true, indicating that the address has been accepted, the output of the AND circuit sets a control flip-flop 90 from its 0 state to its 1 state. It will be understood that all flip-flops and registers change their states in synchronism with clock pulses from a clock source in a conventional manner. The clock source and clock control lines have not been shown in the drawing for the sake of simplicity.

The 1 state of the control flip-flop 90 provides a communication control level going back to the port interchange from the processor. This control level is designated TCCL. When true, it signals the port interchange that Write data is present on the data bus 74 or signals that Read data has been accepted by the processor. When set to 1, the control flip-flop 90 connects the data bus 74 to the main data transfer bus 78 of the processor by a gate 92. In response to the Write Dispatch micro-operator the L-register is gated to the bus 78 by means of a gate 91. At the same time the T-Register 72 is gated to the control bus 76 by gates 94 and 96. Thus the IIO address in the L-register 70 and the designated port and channel information in the T-register 72 are gated on to the data bus 74 and control bus 76 to the port interchange at the same time that the TCCL level goes true.

In response to the TCCL level at the port interchange, the data on the bus 74 is stored in memory location 00 and the designated port and channel information on control bus 76 is stored in the Dispatch register, as will hereinafter be described in detail. The port interchange then again sets the FCCL level true. An AND circuit 98 senses that the TCCL level is true and that the FCCL level has gone true, the output of the AND circuit 98 resetting the control flip-flop 90 to its reset or 0 state, thus completing the Write Dispatch operation by the processor.

Figure 8:
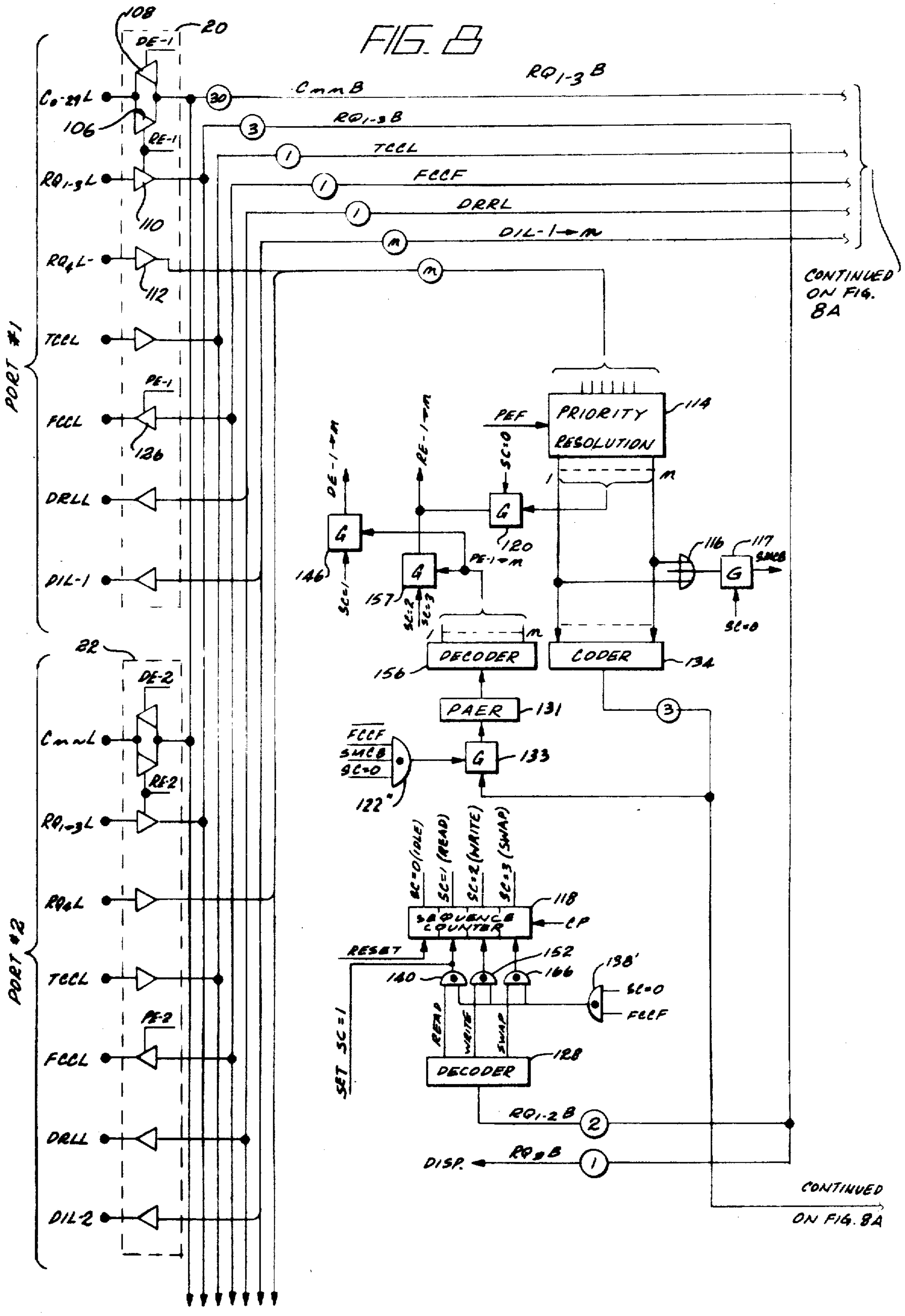
FIGS. 8 and 8A show a detailed schematic block diagram of the port interchange.
Figure 8A:
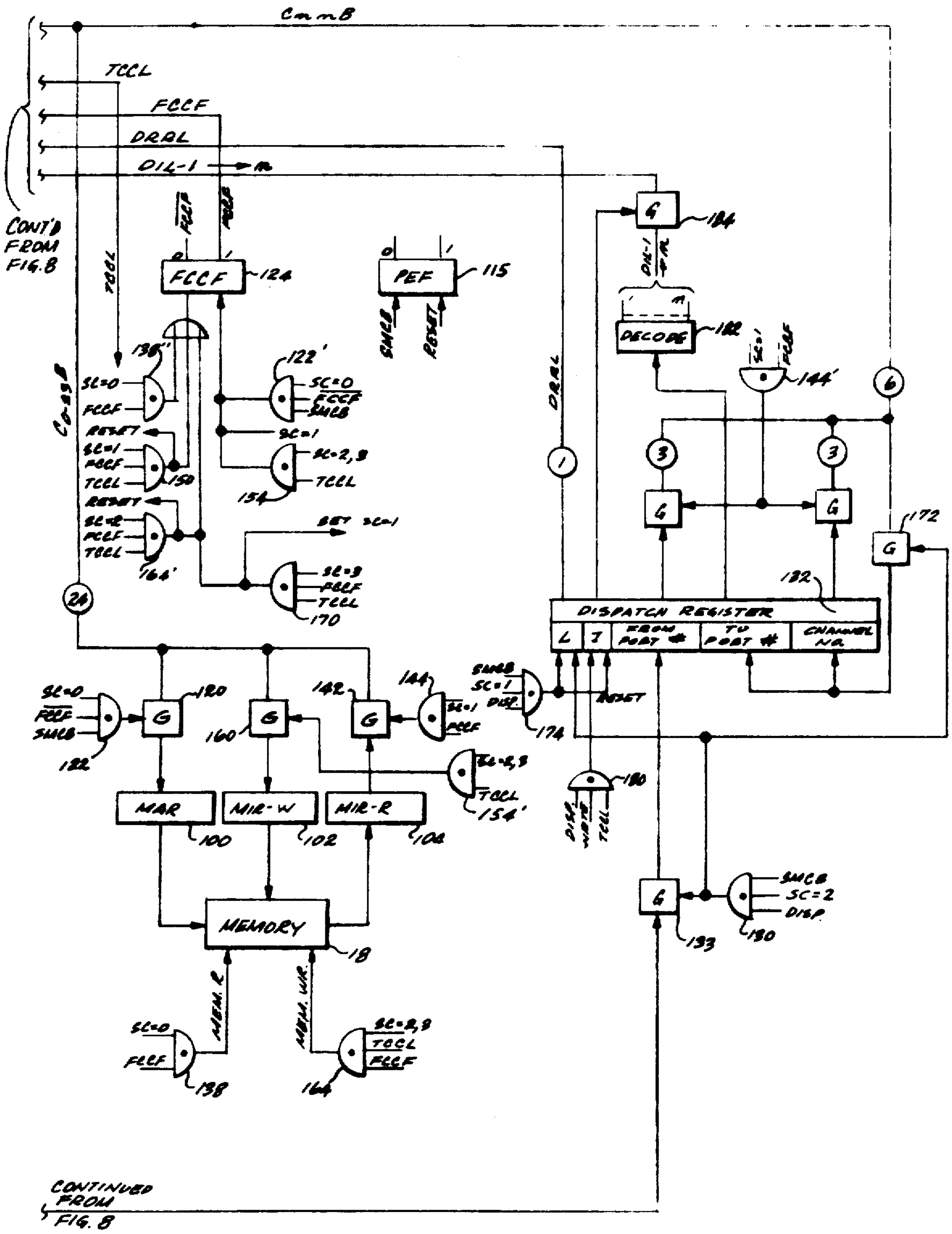

Referring to FIGS. 8 and 8A, the design and operation of the port interchange is shown in detail. The main memory 18, which preferably is a solid-state high-speed memory, but which may be a core memory or other conventional type of addressable memory, has associated therewith an address register (MAR) 100. In addition it has two information registers (MIR) 102 and 104 for respectively storing information to be written into memory and storing information read out of memory. The register 102 is a designated MIR-W and the register 104 is designated MIR-R. Memory 18 has two control inputs, one for initiating a Read operation, referred to as the memory Read control line, and the other for controlling a memory Write operation, referred to as the memory Write control line. The memory 18 is arranged to normally provide 24 bits of information for each memory cycle.

The data and control lines $C_{0-29}L$ at each port interface are coupled to a common bus through port adaptors, two of which are indicated at 20 and 22 in FIG. 8. Each port adaptor includes line drivers, some of which can be turned on and off at appropriate times in a manner hereinafter described. Thus the data on control lines $C_{0-29}L$ are received through a driver amplifier 106 when gated on by a Receive Enable signal RE–1. Output levels on the lines $C_{0-29}L$ are provided by driver amplifier 108 which is gated on in response to a Destination Enable signal DE–1. The $C_{0-29}L$ lines from each of the port adaptors is connected to a common bus of thirty lines, designated $C_{nn}B$.

The request lines $RQ_{1-3}L$ from the port device are connected in each adaptor through drivers 110 to a bus of three lines, designated $RQ_{1-3}B$. The drivers 110 are also turned on by the RE control line to each adaptor.

The $RQ_4L$ line coming into each port adapter is coupled through a driver 112 to one input of a priority resolution circuit 114 which resolves priority among the $RQ_4L$ lines from each of the port devices. The priority resolution circuit is only turned on if a PEF level is on, indicating the interport exchange is free to initiate a memory cycle. This level is provided by a control flip-flop 115, designated PEF, which is normally set to one but is reset to zero when a memory cycle is initiated and again set to one when the memory cycle is completed. Whenever a port device wants to initiate a memory cycle, the $RQ_4L$ line goes true. More than one port device may request a memory cycle at the same time. The priority resolution circuit 114 determines which port has highest priority where simultaneous requests are received and provides an output signal on one of *n* output lines, there being one output line for each port device. Each of these output lines is applied through an OR circuit 116 to a gate 117, the output of which signals when a memory cycle is to be started, the line being designated SMCB. The output of the priority resolution circuit 114 is also applied to coder 134 to provide a binary indication of the port No. given priority. This indication is stored in a PAER register 131 through a gate 133 in response to the output of an AND circuit 122''.

Sequential control of the port interchange in executing a memory cycle is provided by a sequence counter 118 which has four states designated SC=0 or the Idle state, SC=1 or the Read state, SC=2, or the Write state, and SC=3 or the Swap state. Normally, when not executing a memory cycle, the sequence counter 118 is in the Idle state. During the Idle state, the output lines from the priority resolution circuit 114 are applied to a gate 120, the output of which provides the Receive Enable lines RE–1 through RE–n going to the respective adaptors. Assuming that priority resolution has been granted to a request from the processor connected to port No. 1, the line RE–1 goes true turning on the drivers 106 and 110. The drivers 106 during the SC=0 state gate address information from the port device. This address information on lines $C_{0-23}B$ are stored in the MAR register 100 through a gate 120. The gate 120 is controlled by the output of an AND circuit 122 which senses that the SC=0 state is present and that the SMCB level has gone true. It also senses that a control flip-flop 124, designated FCCF, is in its reset or zero state. The control flip-flop 124 provides the FCCL level to each of the line adaptors where it is applied through a driver 126 to the associated port device. As noted above, the FCCL signal indicates to the port device that an address has been accepted, or Write data has been accepted, or Read data is present. The control flip-flop 124 is initially in its reset state, in which the FCCL level is false.

The request lines $RQ_{1-3}B$ from the port device provide coded signals indicating the mode of operation. The $RQ_1B$ and $RQ_2B$ lines are applied to a decoder 128 which, according to the truth table of FIG. 7, sets a Read, a Write, or a Swap level on. The $RQ_3B$ line, when true, provides a Dispatch level that is on.

At the same time the address is gated into the MAR register 100 through the gate 120, the FCCF flip-flop 124 is turned on by the output of an AND circuit 122' which also senses that the SC=0 state is present, the FCCF flip-flop 124 is in its zero state, and the SMCB level is present. While three AND circuits 122, 122' and 122'' are shown for clarity in the drawing, the use of the same reference number indicates that only the output from a single AND circuit could be used to control the several functions. When the FCCF flip-flop 124 is set to one, the FCCL level to the port device goes true from the output of the enabled driver 126 in the selected adapter 20, indicating to the port device connected to port No. 1 that the address has been accepted.

When FCCF is set to one, AND circuit 138 (FIG. 8A) sensing that SC=0 and FCCF is true, initiates a memory Read cycle in the memory 18, causing the word at the location specified by the contents of the MAR register 100 to be transferred into the MIR-R register 104 from the memory. At the same time, the sequence counter 118 is advanced to one of its other three states depending on the output of the decoder 128. An AND circuit 140 sets the sequence counter to the SC=1 state if the decoder indicates that a Read mode is called for by the port device, as determined by the output of the decoder 128. The AND circuit 140 also senses the SC=0 state and that the FCCF level is true, as provided by the output of AND circuit 138'. At the same time, the SC=0 state and the FCCF state are applied to AND circuit 138'' (FIG. 8A) to reset the FCCF flip-flop 124 to its zero state, thus turning off the FCCL level to the port device.

With the sequence counter 118 advances to the SC=1 state, information is made present on the $C_{0-23}L$ lines to the port device from the MIR-R register 104. This is accomplished by again turning on the FCCF control flip-flop 124 during the SC=1 state. When the FCCF control flip-flop is set, it causes the contents of the MIR-R register 104 to be gated to the data bus by means of a gate 142 in response to the output of an AND circuit 144 which senses that the SC=1 state of the sequence counter 118 is true and that the FCCF flip-flop 124 is set to one. Also during the SC=1 state, the driver 108 in the port adaptor 20 is turned on by a DE-1 level from a gate 146 from the output of the PAER register 131 through a decoder 156.

The PE-1 line at the output of the decoder 156 is also applied to the driver amplifier 126, enabling the FCCL level to be transmitted to the port device. As a result, the port device is signaled that information is present on the $C_{0-29}L$ bus. The port device, as described above in connection with FIG. 6, returns a TCCL level when the data has been accepted. This level is used to reset the FCCF flip-flop 124 to zero by the output of an AND circuit 150 which senses the SC=1 state, that the TCCL level is true, and that the FCCF level is true. The output of the AND circuit 150 is used to reset the sequence counter 118 back to the SC=0 state, thereby completing the memory Read operation.

In a memory Write operation, the sequence counter is set to the SC=2 state from the SC=0 state by the output of an AND circuit 152. The AND circuit 152 senses that a Write operation is requested and that the output of AND circuit 138' is true. During the SC=2 state, the FCCF flip-flop 124 is turned on by the output of an AND circuit 154 when the TCCL level from the port device goes true, indicating that data is present on the $CE_{0-29}L$ lines from the port device. The receive drivers in the port adaptor are turned on by gating the appropriate level from the output of the decoder 156 through a gate 157 during the SC=2 state to provide the RE-1 control level to the driver amplifier 106. When PCCL goes true, indicating that data is present, the data on lines $C_{0-23}B$ is gated into the MIR-W register 102 by a gate 106 in response to the output of an AND circuit 154'. A memory Write cycle of the memory 18 is then initiated by the output of an AND circuit 164 during the SC=2 state when both the TCCL level is on and the FCCF flip-flop 124 is on. An AND circuit 164' at the same time resets the FCCF flip-flop 124 to zero and resets the sequence counter 118 back to the SC=0 state.

The memory Swap operation is initiated by the output of an AND circuit 166 when the decoder 128 signals a Swap operation. This sets the sequence counter 118 to the SC-3 state. The SC=3 state first causes a memory Write operation by opening the gate 160, turning on the FCCF flip-flop 124, and initiating a memory Write in the memory 18. However, instead of resetting the sequence counter back to 118, an AND circuit 170, in response to the SC=3 state, FCCF and TCCL, in addition to resetting the FCCF flip-flop 124, sets the sequence counter 118 to SC=1. As a result the memory Write operation is followed by transfer of data from the MIR-R register 104 back to the port device, in the manner described above for a Read operation.

The Write Dispatch operation and the Read and Clear Dispatch operation involve the normal Write and Read memory cycles described above. However, the $RQ_3B$ line is true indicating a Dispatch. Assuming a Write Dispatch operation has been initiated by the processor connected to port No. 1, as provided by block 42 in the flow diagram of FIG. 4, the decoder 128 will indicate a Write operation, and the Dispatch level will be true.

During a Write Dispatch operation, an AND circuit 130 (FIG. 8A) senses the Write Dispatch operation is present, and when SMCB level from the gate 117 goes true, it turns on the Lockout bit L in the Dispatch register, indicated at 132. The Dispatch register, which has been referred to above, stores a Lockout bit L which indicates to all the port devices by means of the DRLL signal when the Dispatch register is being used by one of the port devices for a Dispatch operation. No other port device can initiate a Dispatch operation while the Lock bit is on. The output of the AND circuit 130 also causes the number of the port device initiating the Dispatch operation to be stored in the Dispatch register 132 as the From Port No. This is accomplished by a gate 133 which gates the From Port No. into the Dispatch register from the coder 134 which generates the From Port No. in response to the output of the priority resolution circuit 114.

In addition, the output of the AND circuit 130 gates the control lines $C_{24-29}B$ through a gate 172 to set the To Port No. and the Channel No. portions of the Dispatch register 132. A Dispatch Interrupt bit I is set in the register 132 in response to the output of an AND circuit 180 which senses a Write Dispatch and that the TCCL level from the port device is true. With the bit I set in the Dispatch register 132, it gates Dispatch Interrupt level DIL to the particular port device identified by the To Port No. in the Dispatch register 132. To this end, the To Port No. is applied to a decode circuit 182 to set the level on a line corresponding to one of the port devices through a gate 184, which is gated on by the Dispatch Interrupt bit in the Dispatch register. The DIL signal indicates to the corresponding port device that a Dispatch Interrupt is present. For a Read and Clear Dispatch, the normal Read operation is augmented by resetting the L and I bits in the Dispatch register 132 by the output of an AND circuit 174.

As pointed out above, when the processor desires to initiate an input/output operation, it does a Write Dispatch operation, in which the address of the input/output descriptor is stored in main memory location 00 and the Dispatch register has the Lockout bit and the Dispatch Interrupt bit turned on and has the From Port No. and the To Port No., as well as the Channel No., if appropriate, stored therein. The Dispatch Interrupt level DIL signals the designated port device that there is a dispatch message present. Assuming that the particular port device receiving the Dispatch Interrupt is an input/output control unit, as discussed above in connection with the flow diagram of FIG. 4, the input/output unit responds to the Dispatch Interrupt level to start an input/output operation.

Figure 9:
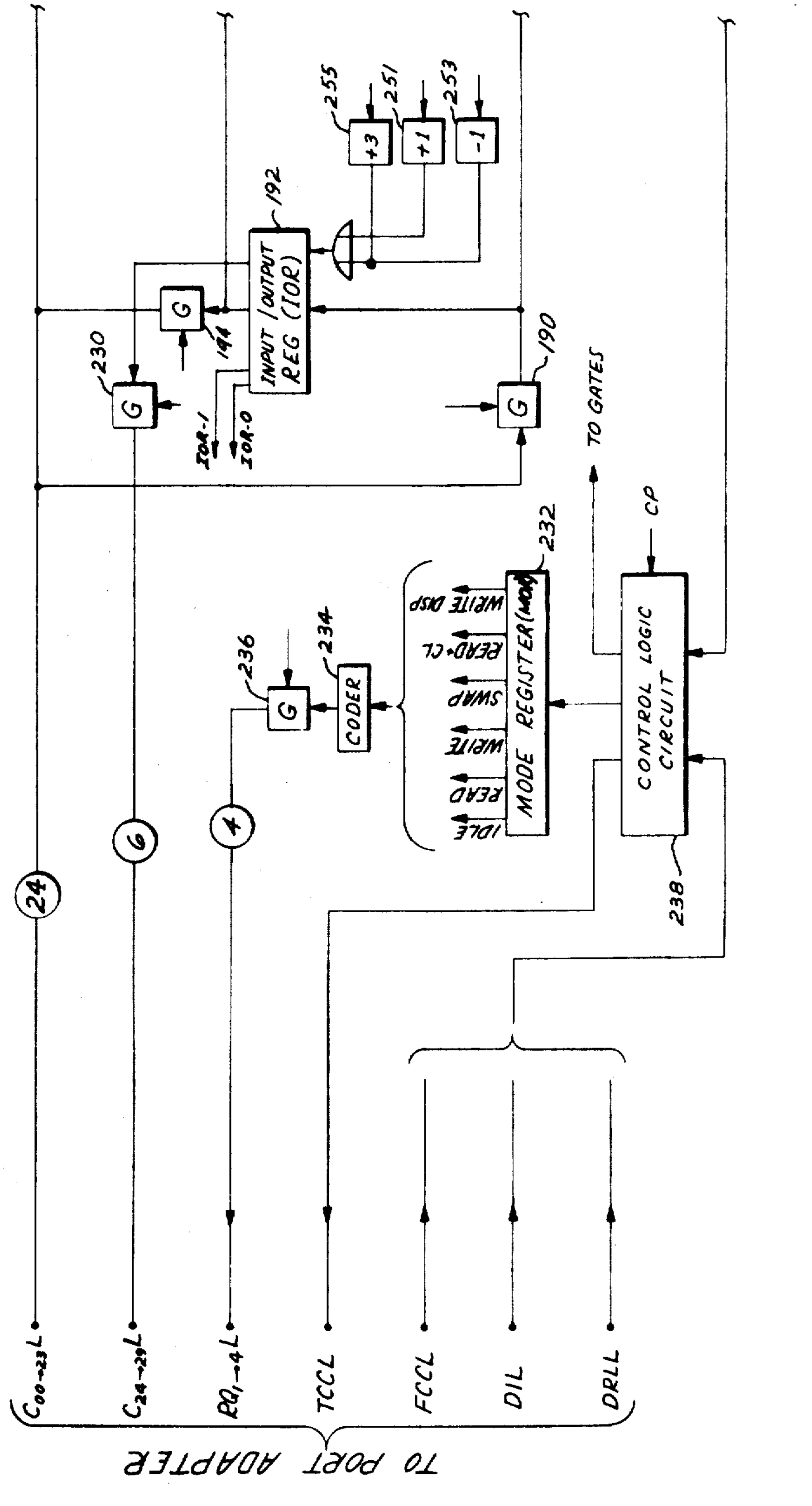
FIGS. 9 and 9A show a detailed schematic block diagram of the input/output control unit.
Figure 9A:
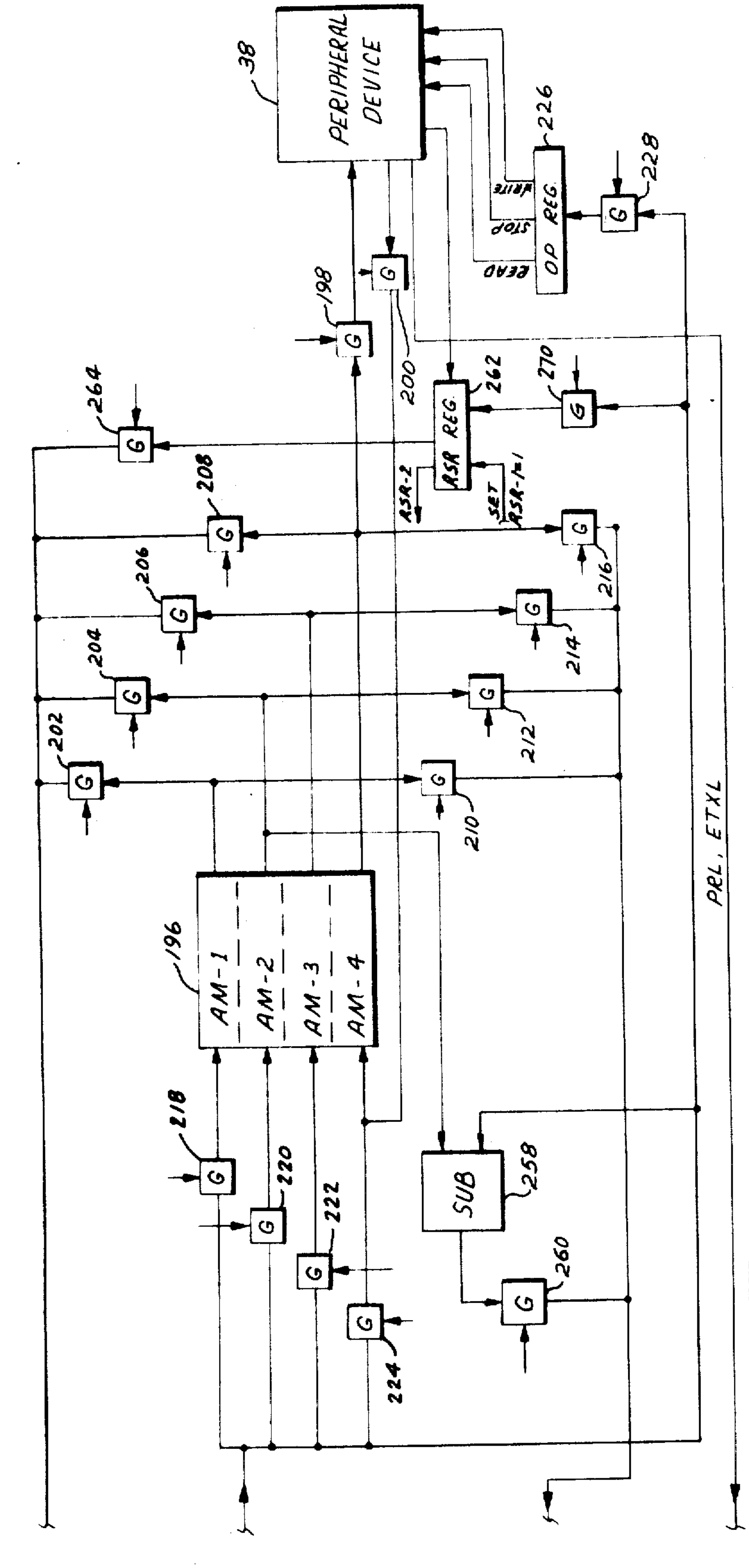
Figure 10:
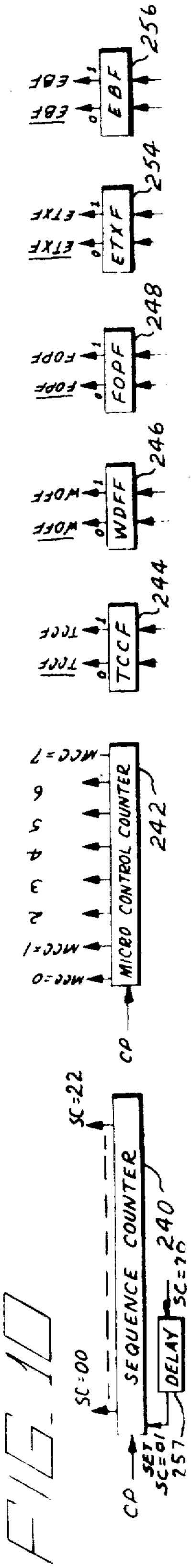
FIG. 10 is a schematic block diagram of the registers and control flip-flops in the input/output control unit.

The construction and operation of the input/output control unit for controlling transfer of data between a peripheral device and main memory may best be understood by reference to FIGS. 9, 9A and 10. The bus $C_{0-23}L$ for transferring data words between the port device and the port adaptor is connected by a gate 190 to an Input/Output Register (IOR) 192. A gate 194 gates the contents of the IOR register 192 onto the bus $C_{0-23}L$.

The control unit further includes a scratchpad memory 196 which consists of at least four registers, designated AM–1 through AM–4, which are used for temporary storage of addresses and as a buffer for use with the transfer of data to the peripheral device, indicated at 38. For this purpose, the register AM–4 in the scratchpad memory 196 is coupled to the input of the peripheral device 38 through a gate 198 and is coupled to the output of the peripheral device by a gate 200. An output from any one of the four registers in the scratchpad memory 196 may be gated to the data bus $C_{0-23}L$ by gates 202, 204, 206, and 208, respectively. The output from any of the registers in the scratchpad memory 196 may likewise be gated to the IOR register 192 by means of gates 210, 212, 214, and 216, respectively. The output of the IOR register 192 may be gated to any of the four registers in the scratchpad memory 196 by gates 218, 220, 222, and 224, respectively. The contents of the IOR register 192 may also be transferred to an OP register 226 by a gate 228. The output of the OP register provides control signals to the peripheral device 38 indicating whether the operation command stored in the OP register 226 calls for a Write operation, a Read operation, or a Stop operation, for example. The IOR register 192 may be also used to send control information on lines $C_{24-29}L$ to the port interchange through a gate 230.

The request lines $RQ_{1-4}L$ from the port adaptor are controlled by a Mode register 232 which is shown as including six states, including an Idle state, a memory Read, Write, or Swap state, a Read and Clear state, and a Write Dispatch state. The state of the Mode register 232 is applied to a coding circuit 234 which, according to the truth table of FIG. 7, providing appropriate levels on the lines $RQ_{1-4}L$ through a gate 236. A control logic circuit 238 receives the input control levels FCCL, DIL, and DRLL from the port adapter, and also receives control levels from the peripheral device 38 and in response thereto provides the output control level TCCL to the port adaptor, controls the Mode register 232, and controls the various gates within the input/output control unit.

As shown in FIG. 10, the central control unit 238 includes a sequence counter 240 which has 23 control states, designated SC=00 through SC=22. Each control state is used to control one functional operation of the control unit. In addition, a micro control counter 242 having up to eight states, designated MCC=0 through MCC=7, is provided. The micro control counter is used to subdivide each state of the sequence counter into any number of sub-states up to eight. In addition, a number of control flip-flops are provided, including a TCCF flip-flop 244, a WDFF flip-flop 246, an FOPF flip-flop 248, an ETXF flip-flop 254, and a EBF flip-flop 256.

To simplify the understanding of the operation of the input/output control, the control logic of the control circuit has been illustrated in the drawings in the form of flow diagrams, indicated as FIGS. 11 through 21. Each figure shows at least one state of the sequence counter and the steps performed during successive substates of the micro control counter. Normally the micro control counter advances one sub-state with each clock pulse, unless otherwise indicated. Each block in a flow diagram has the condition of the micro control counter indicated above the left-hand corner in the figure. If only the condition of the sequence counter is indicated in the left-hand corner of the block, the operation does not depend on the state of the micro control counter. The right-hand portion of each block in the flow diagram indicates the special conditions which control, while the left-hand half of the block shows the operations that take place with the next clock pulse CP. The arrow ← is the replacement operator and may be translated "is set to" in reading the control functions set forth in the flow diagram. Thus WDFF ← 1 means that the WDFF flip-flop 246 is set to the 1 state if the indicated conditions are present. If a gate is involved in the replacement, the gate is identified to the left of the block.

Figure 11:
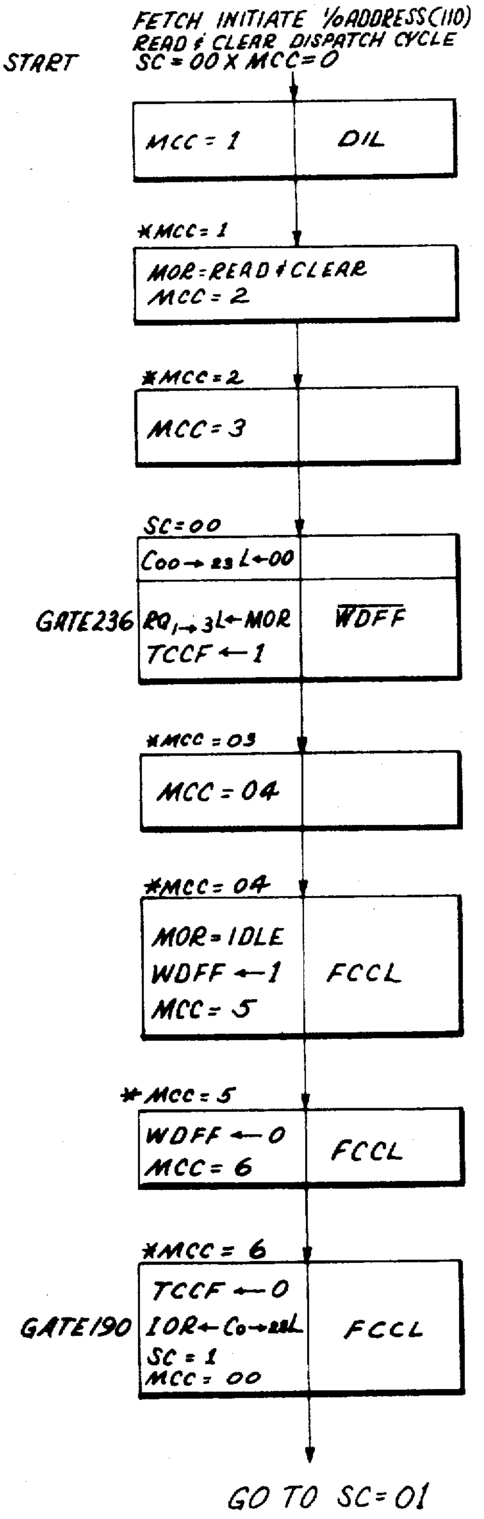
FIGS. 11 – 21 are the logical flow diagrams for the control logic of the input/output control unit.

With the input-output control unit in a standby condition, the sequence counter is initially at SC=00 and the micro control counter is initially at MCC=0. Referring to FIG. 11, when a DIL level received from the port adaptor goes true, indicating that a Dispatch Interrupt is present, the input/output control unit must fetch the IIO address from memory 18 and the control information from the Dispatch register 132 in the Port Interchange 16 by doing a Read and Clear operation.

As shown by the flow diagram in FIG. 11, with SC=00 and MCC=0, when DIL goes true (SC=00 MCC=0 DIL), the micro control counter 242 is advanced to MCC=1 by the next clock pulse. With MCC=1, the Mode register (MOR) 232 is set to the Read and Clear state and MCC is advanced to MCC=2. With MCC=2, no action takes place except to advance to MCC=3. During the SC=00 state of the sequence counter 240, the lines $C_{00-23}L$ are normally at the 0 level. This provides the 00 address to the port interchange for doing a memory Read operation to fetch the IIO address from memory. With the WDFF flip-flop initially reset to its 0 state ($\overline{WDFF}$), the state of the MOR register 232 is coded and applied to the lines $RQ_{1-4}L$ through the gate 236 and the TCCF flip-flop is set to 1. The TCCF flip-flop generates the TCCL level to the port adaptor, indicating that the address (00) is present on the line $C_{00-23}L$.

The micro control counter advances from MCC=3 to MCC=4, no special action taking place during MCC=3. With MCC=4, when FCCL goes true, indicating the address is accepted by the port interchange, the MOR register 232 is returned to IDLE, the WDFF flip-flop 246 is set to one, and MCC is advanced to MCC=5. With MCC=5, when FCCL goes true, indicating IIO address is not present on the data bus from the port interchange, the WDFF flip-flop 246 is reset to zero and MCC is advanced to 6. With MCC=6 and FCCL true, the IIO address on lines $C_{0-23}L$ is stored in the IOR register 192 through gate 190. The TCCF flip-flop 244 is reset, MCC is reset to zero, and the sequence counter 240 is set to SC=1.

Figure 12:
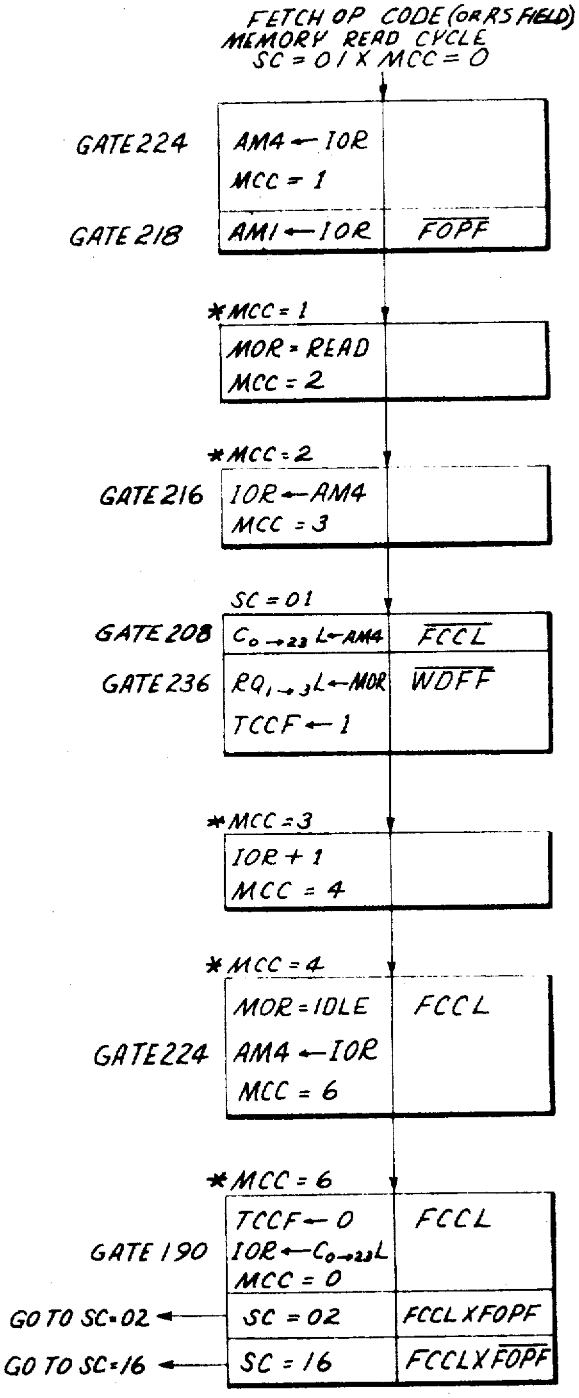

During SC=1, the control unit fetches the Result Status field of the I/O descriptor or the OP code field, depending on the condition of the FOPF control flip-flop 248. As shown by the diagram of FIG. 12, with SC=1 and MCC=0, the IIO address pointing to the Result Status field stored in the main memory is transferred from the IOR register 192 to the AM4 register of the scratchpad memory 196 by gate 224. If the FOPF flip-flop is in the zero state ($\overline{FOPF}$), this address is also stored in the AMI register by gate 218. With MCC advanced to MCC=1, the MOR register 232 is set to the Read State.

With SC=1 and $\overline{FCCL}$, the address in AM4 is gated onto the lines $C_{0-23}L$. With the control flip-flop 246 set to zero ($\overline{WDFF}$), the Read mode is coded and gated onto the $RQ_{1-23}L$ lines to the port interchange by gate 236 to initiate a memory Read cycle. Also TCCF flip-flop 244 is set to one to indicate an address is present on the $C_{0-23}L$ lines.

With MCC=3, the address (IIO) in the IOR register 192 is incremented to the next address (IIO + 1), which is the address of the OP-code field of the I/O descriptor. With MCC=4, when FCCL is true, indicating the address is accepted by the port interchange, the MOR register 232 is reset to the IDLE state, and the incremented address in IOR register 192 is stored in AM4 through gate 224.

With MCC=6, when FCCL is true, indicating data is present, the data on the lines $C_{0-23}L$ is gated into the IOR register 192 through gate 190. If the FOPF control flip-flop 248 is set to one, the sequence counter is set to SC=2, but if the control flip-flop 248 is set to zero, the sequence counter is set to SC=16. Since initially the FOPF control flip-flop 248 is zero, the next control state will be the SC=16 state shown in FIG. 13.

At the end of the SC=1 state when it is initially executed with the FOPF flip-flop set to zero, the Result Status field of the Input/Output descriptor has been read from main memory and is now present in the IOR-register 192. During the SC=16 control state of the sequence counter 240, with the micro control counter 242 at 0, the OC bit of the Result Status field, which is in the most significant bit position IOR-O of the IOR register 192, is tested to determined whether it is 0 or 1, indicating whether the input/output descriptor has not been completed or has been completed. If IOR—0=0 (OC=0), the sequence counter is set to SC=17. If IOR—O=1 (OC=1), indicating that the input/output operation has been completed, the sequence counter is set to SC=20. At the same time, the contents of the AM1 register of the scratchpad memory 196 is transferred to the IOR register 192 by the gate 202 at the completion of the SC=16 state, so that the IOR register 192 again contains the address of the Result Status field of the descriptor in main memory.

Assuming that the Operation Complete bit in the Result descriptor field is off (OC=0), and the sequence counter 240 has been set to SC=17, the address (IIO) in the IOR register 192 is decremented by 1 (IIO—1). This is accomplished by activating a circuit 253 (see FIG. 9) which subtracts 1 from the contents of the IOR register 192. The decremented address now points to the location of the Final Address field which is the first field in the descriptor in the I/O descriptor, as shown in FIG. 2. The sequence counter 240 is then set to the SC=18 state.

During the SC=18 state, the address in the IOR register 192 is transferred to the AM1 register of the scratchpad memory 196 through the gate 218 and stored. The sequence counter 240 is advanced to the SC=19 state. During this state, the contents of the IOR register 192 is incremented by 3 by means of activating a circuit 255 which adds 3 to the IOR register 192. The incremented address in the IOR register 192 (IIO = 2) now points to the OP code field of the I/O descriptor in main memory. See FIG. 2. At the same time the FOPF control flip-flop is set to the 1 state, indicating that the Operation Complete bit in the Result descriptor was off and that the I/O operation can proceed. The sequence counter is then returned to the SC=1 state described above in connection with FIG. 12.

Figure 13:
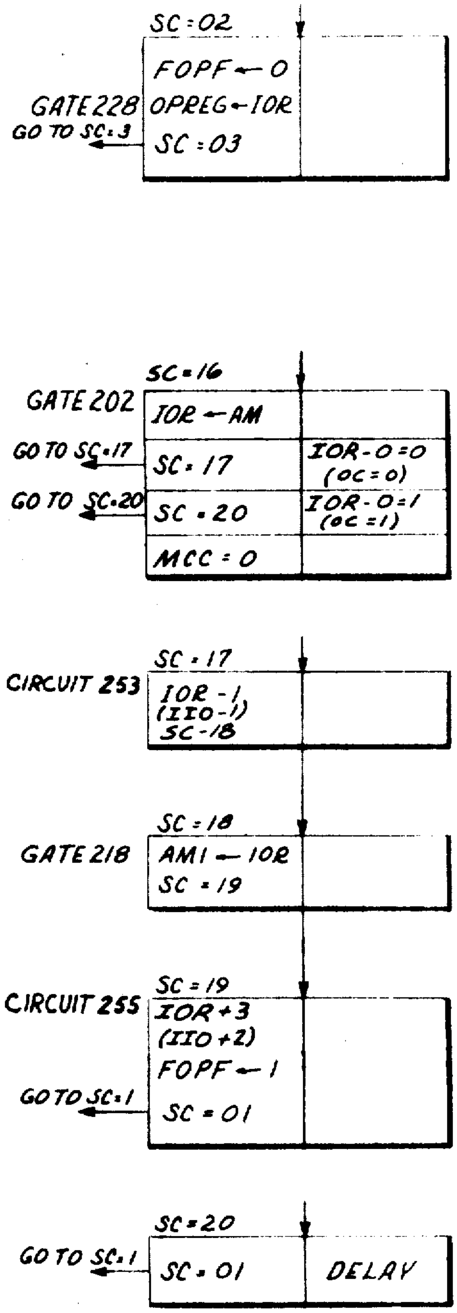

Returning to the SC=16 state, as shown in FIG. 13, if the Operation Complete bit is on (OC=1), the sequence counter is set to SC=20. During the SC=20 state, operation of the I/O control unit is suspended for some predetermined period of time, as provided by a delay circuit 257, after which the sequence counter is reset to SC=1. It will be seen that as long as the Operation Complete bit remains on (OC=1) in the Result Status field of the I/O descriptor, the sequence counter keeps recycling through the SC=1 state, the SC=16 state, the SC=20 state, and back to the SC=1 state indefinitely. This recycling continues until the Operation Complete bit in the Result Status field in main memory is turned off. This is done by the control software of the system, executed through the processor, whenever the buffer area in main memory defined by the I/O descriptor is not currently being used by the processor. For example, if an I/O operation should load a buffer area in main memory from a peripheral device, in the manner hereinafter described, the Operation Complete bit is turned on in the Result Status field. The data stored in the buffer area in the main memory is then available to the program being executed by the processor. When the processor is through with this data it can programmatically access the Result Status field and reset the Operation Complete bit off, signaling that the buffer area can again be used to store new data from the peripheral device by executing the I/O descriptor again. If the buffer area has been loaded with data by the program which can now be transferred to some peripheral device, the Result Status field will be modified programmatically to turn off the Operation Complete bit and to set the OP code field of the descriptor to a Write command, so that execution of the descriptor will cause the data to be transferred to the peripheral device. The manner in which a processor programmatically controls the Operation Complete bit in the Result Status field stored as part of the descriptor in memory is outside the scope of the present invention and therefore is not described herein.

Once the FOPF control flip-flop 248 has been turned on, the sequence counter advances from the SC=1 state to the SC=2 state, as described above in connection with FIG. 12. The SC=2 state, as shown in FIG. 13, causes the FOPF control flip-flop 248 to be reset to 0 and causes the OP code, which is present in the IOR register 192 as the result of the memory Read cycle performed during the SC=1 state, to be transferred to the OP register 226 through the gate 228. The sequence counter is then advanced to the SC=3 state.

Figure 14:
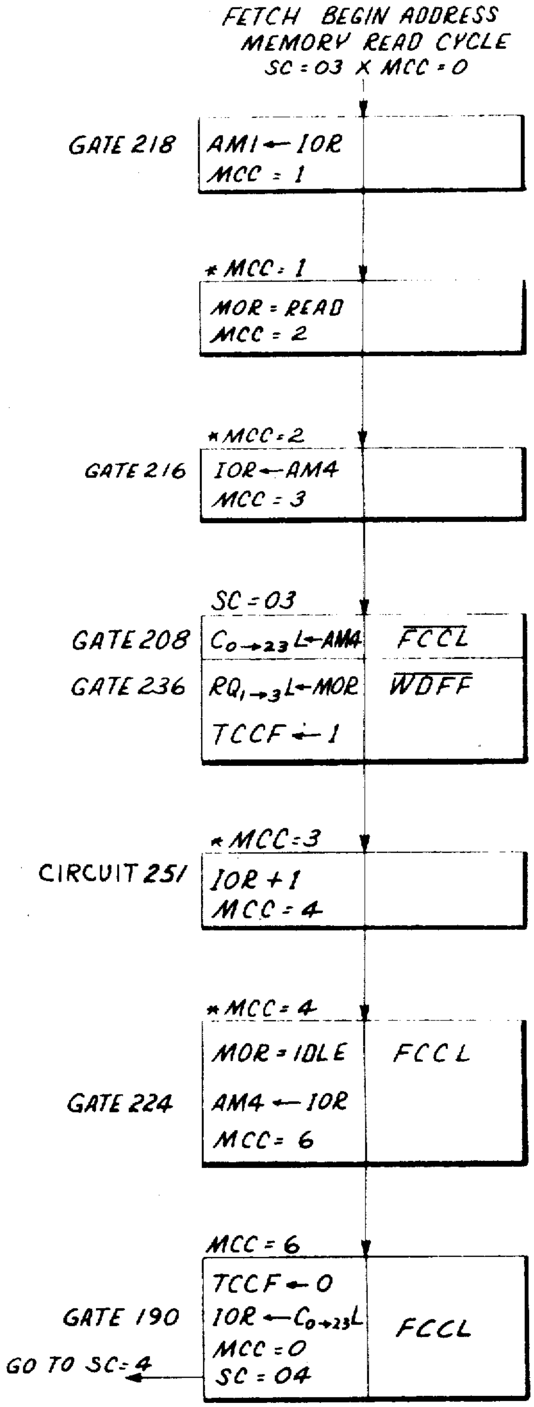

As shown in FIG. 14, during the SC=3 state, the Begin Address field of the I/O descriptor is read from main memory into the IOR register 192. Initially, with MCC=0, the contents of IOR register 192, the OP code field, is stored in the AM1 register of scratchpad memory 196. This is a redundant operation at this time. The MOR register 232 is then set to the Read state when MCC=1. The address of the Begin Address field of the descriptor, which was stored in the AM4 register of scratchpad memory 196 at the end of the SC=1 state, is then transferred to the IOR register 192 through the gate 216 when MCC=2. During the SC=3 state, when the FCCL level is off, the Begin Address field in AM4 is coupled to the data lines $C_{0-23}L$ by gate 208 so as to send the address back to the port interchange. Also with the WDFF control flip-flop 246 off, the Read status of the Mode register 232 is sent back to the port interchange over the control lines $RQ_{1-4}L$ through the gate 236 and the TCCF control flip-flop is set to 1. As a result the TCCL level received at the port interchange indicates that the address is present on the data lines and the $RQ_{1-4}L$ lines indicate that a memory Read cycle is requested.

During the MCC=3 state, the address (IIO + 3) in the IOR register 192 is incremented by 1 to IIO + 4). During the MCC=4 state, when the FCCL level comes on, indicating that the port interchange has accepted the address, the Mode register 232 is returned to the IDLE state and the incremented address in the IOR register 192 is transferred to the AM4 register of the scratchpad memory through gate 224. During the MCC=6 state, when FCCL goes true, the TCCF control flip-flop 244 is reset to 0, the data on the line $C_{0-23}L$ is gated into the IOR register 192 through the gate 190, and the sequence counter is advanced to the SC=4 state. The IOR register 192 now contains the beginning address of the buffer area in memory as read out of the Begin Address field of the descriptor in main memory.

Figure 15:
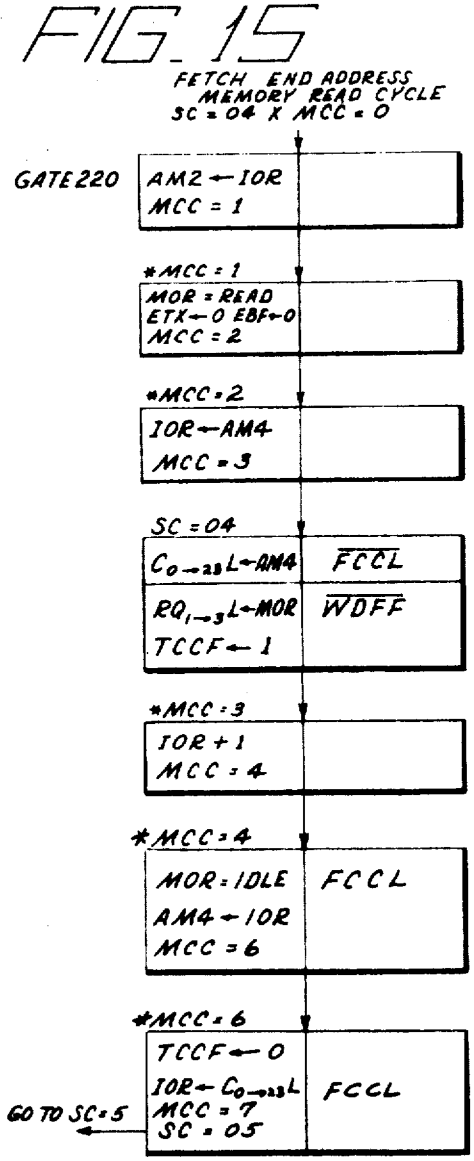

As shown in FIG. 15, during the SC-4 state, a memory Read cycle is repeated on the End Address field of the I/O descriptor stored in main memory. During the initial step of the SC=4 state, the Begin Address, placed in the IOR register during the SC=3 state, is transferred to the AM2 register of the scratchpad memory 196 through gate 220. With MCC=1, two control flip-flops, the ETXF flip-flop 254, and an EBF flip-flop 256 are reset to zero to make sure they are cleared at this time. Otherwise the operation is the same as the SC=3 state described in connection with FIG. 14 with the End Address being transferred from main memory into the IOR register 192. However, during the last step, the micro control counter 242 is advanced to the MCC=7 state, rather than being reset to 0. At the same time the sequence counter 240 is advanced to the SC=5 state.

Figure 16:
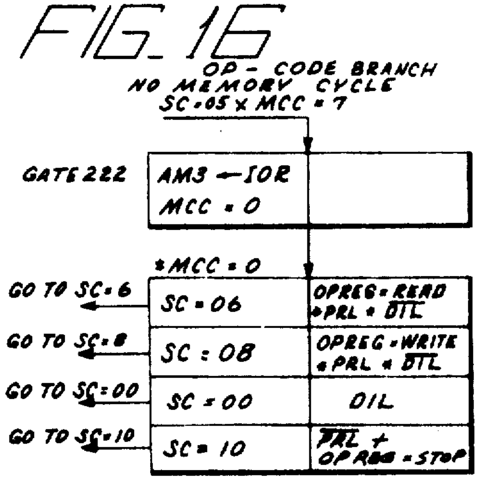

As shown in FIG. 16, with the sequence counter in the SC=5 state, there is a branching to the OP code stored in the OP register. With MCC=7, the End Address stored in the IOR register 192 is transferred by gate 222 to the AM3 register of the scratchpad memory 196. The micro control counter is then reset to MCC=0. If the command in the OP register 226 is a Read and the Dispatch Interrupt signal DIL is off and the Peripheral Device Ready (PRL) line from the peripheral device is on, indicating the peripheral device is not busy but is ready to receive a command, the sequence counter 240 is set to SC=6. If the OP register 226 instead of having a Read command has a Write command, the sequence counter is set to SC=8. If the OP register has a Stop command or the peripheral device is busy ($\overline{PRL}$), the sequence counter 240 is set to SC=10. If the Dispatch Interrupt signal DIL is on at this time, the sequence counter 240 is reset to SC=0.

Figure 17:
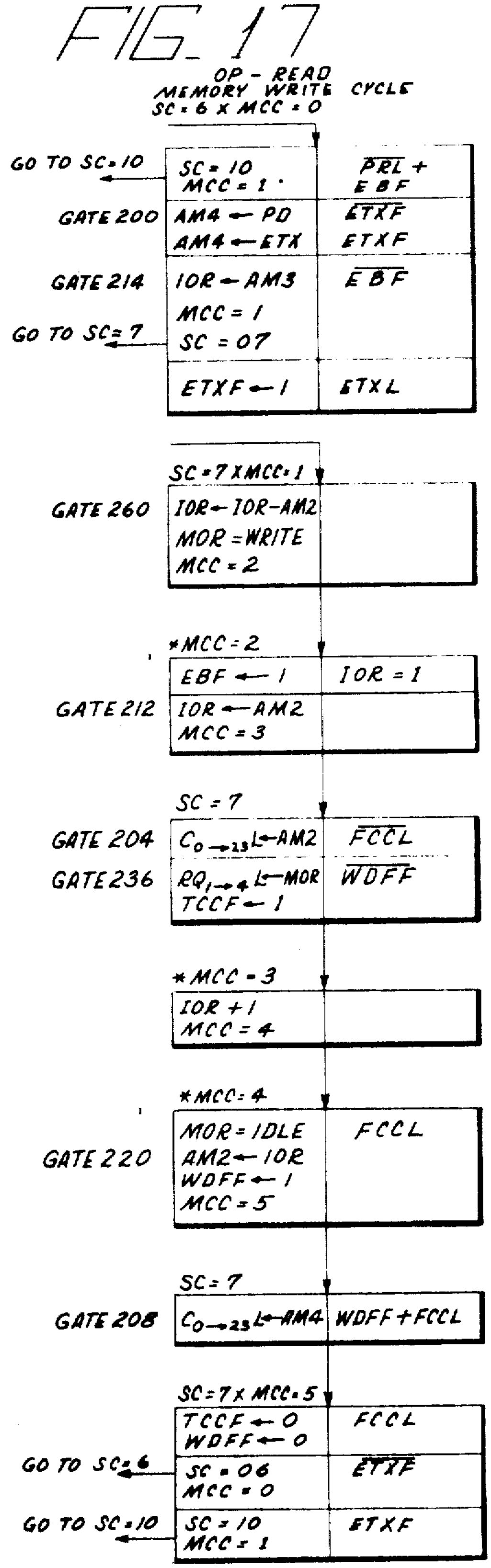

Referring to FIG. 17, the flow diagram for operation of the input/output control unit during the transfer of data from the peripheral device to the main memory in response to a Read command is shown. With MCC=0, if the PRL line is off, or the EBF control flip-flop 256 is on, the sequence counter 240 is set to the SC=10 state. At the same time, the micro control counter is set to MCC-1. If the ETXF control flip-flop 254 is in its 0 state, transfer of data from the peripheral device (PD) through the gate 200 into the AM4 register of the scratchpad memory 196 takes place. The AM4 register is used as the data buffer register in the transfer of data from the peripheral device to main memory. If the ETXF flip-flop 254 is set to 1, then an ETX (End of Text) character is transferred into the AM4 register.

If the EBF control flip-flop 256 is in its 0 state, indicating that the end of the buffer area in main memory has not been reached, the end address stored in the AM3 register is transferred by the gate 214 to the IOR register 192, the micro control counter is set to MCC=1, and the sequence counter is set to SC=7 so that a memory Write cycle can be initiated for transferring the data from the AM4 register to main memory.

The peripheral device 38 generates a signal when the last piece of data is transferred from the peripheral device. This level, referred to as ETXL, is used to set the ETXF control flip-flop 254 to one.

With the sequence counter 240 set to the SC=7 state and the micro control counter 242 set to the MCC=1 state, a test is first made to determine if the end of the buffer in main memory has been reached. A subtractor circuit 258 subtracts the address in the AM2 register from the address in the IOR register 192 and by means of gate 260 places the difference in the IOR register 192. At the same time, the Mode register 232 is set to the Write state and the micro control counter 242 is advanced to the MCC=2 state.

During the MCC=2 state if the IOR register 192 is equal to 1, indicating that the end of the buffer has been reached, the EBF control flip-flop 256 is set to its 1 state. At the same time, the address in the AM2 register is transferred by gate 212 into the IOR register 192 and the micro control counter 242 is advanced to MCC=3. During the SC=7 state, to send the address to the port interchange, when the FCCL level from the port interchange is off, the address in the AM2 register is gated on to the data lines $C_{0-23}L$ through gate 204, thus providing an address to the main memory for the data transfer.

During the MCC=3 state, the IOR register 192 is incremented by 1 and the micro control counter 242 is advanced to MCC=4. During the MCC=4 state when the FCCL level comes on, indicating that the address has been accepted, the Mode register 232 is reset to the IDLE state, the incremented address in the IOR register 192 is stored in the AM2 register through gate 220, the WDFF control flip-flop 246 is set to 1, and the micro control counter 242 advances to MCC=5.

Still referring to FIG. 17, during the SC=7 state in doing a Write operation, whenever either the control flip-flop WDFF 246 is on or the FCCL level comes on, the data in the AM4 register is gated on to the data lines $C_{0-23}L$ through gate 208. With MCC=5 and the FCCL level on, indicating that the data has been accepted by the port interchange, the TCCF control flip-flop 244 is reset to 0 and the WDFF control flip-flop 246 is reset to 0. If the ETXF control flip-flop 254 is still in its 0 state, the sequence counter 240 is returned to the SC=6 state and the micro control counter 242 is reset to 0. However, if the ETXF flip-flop 254 is on, indicating the end of the message has been reached, the sequence control counter is set to SC=10 and the micro control counter 242 is set to MCC=1.

Figure 18:
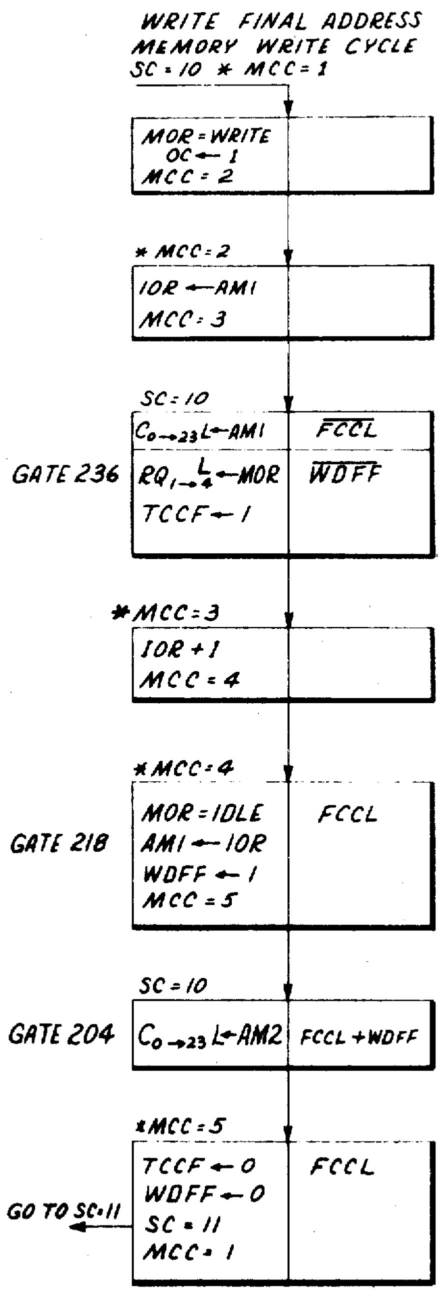

As shown in the flow diagram of FIG. 18, with the sequence counter set to 10, the final address of the data transferred into memory is written into the Final Address field of the I/O descriptor in main memory by executing a memory Write cycle. To this end, with MCC=1, the Mode register 232 is set to the Write state. With the micro control counter advanced to MCC=2, the address in the AM1 register of the scratchpad memory is set into the IOR register 192 and the micro control counter advanced to 3. The address in AM1 points to IIO−1, the location in the descriptor where the Final Address field is located. During SC=10, with the FCCL level from the port interchange being off, the address in the AM1 register is applied to the data lines $C_{0-23}L$ to provide the address to the port interchange. With the WDFF control flip-flop 246 set to 0, the state of the Mode register 232 is gated to the $RQ_{1-4}$ L control lines by the gate 236 and the TCCF flip-flop is set to 1. During the MCC=3 state, the IOR register 192 is incremented by 1 and the micro control counter is advanced to 4.

When the FCCL level comes on, the Mode register 232 is reset to the IDLE state, the incremented address in the IOR register 192 is transferred by gate 218 to the AM1 register, the WDFF control flip-flop is set to 1, and the micro control counter is advanced to 5.

With FCCL true, or with the WDFF control flip-flop set to 1, the final address in the register AM2 is applied as data to the data lines $C_{0-23}L$ by gate 204. With MCC=5, and the FCCL line true, the TCCF flip-flop is reset to 0, the WDFF flip-flop 246 is reset to 0, the sequence control counter is advanced to the SC=11 state, and the micro control counter is reset to 1.

Figure 19:
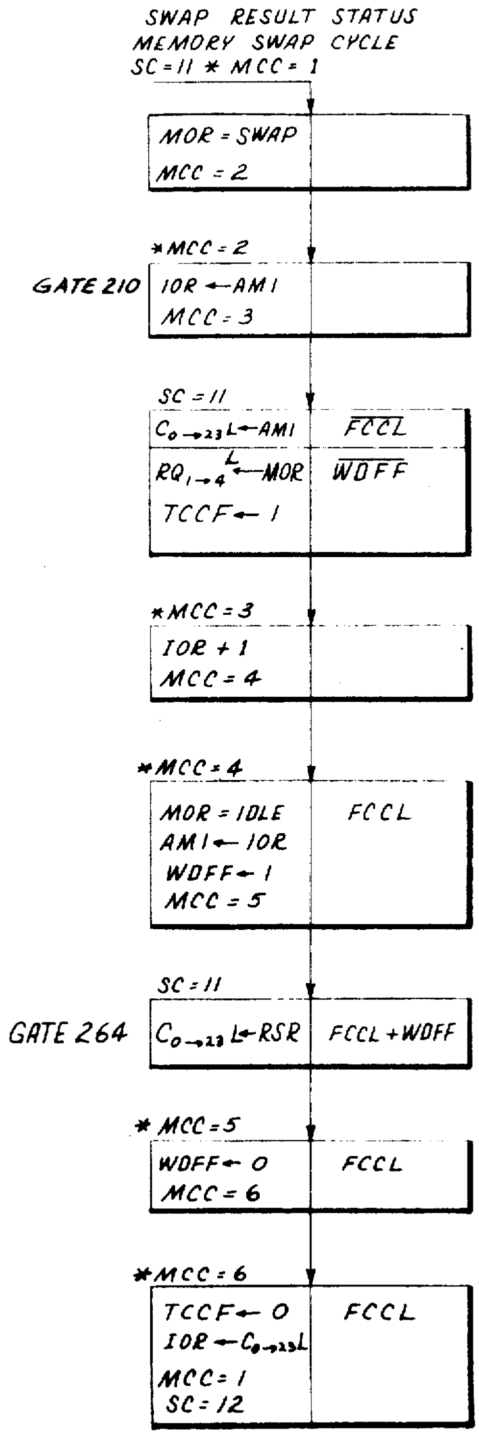

As shown by the flow diagram of FIG. 19, with the sequence control counter in the SC=11 state, the I/O control unit does a memory Swap operation in which it receives the prior Result Status bits in the I/O descriptor from main memory and writes new Result Status bits into the same field of the I/O descriptor in main memory. The Result Status conditions set bits in an RS register 262 from the peripheral device. The conditions vary with the type of peripheral device but include setting the Operation Complete bit and, if appropriate, setting bits indicating an exception condition and the type of condition, such as a Not Ready condition, a Parity Error condition, a Memory Access Error, and other types of conditions peculiar to the peripheral device, such as beginning or ending of tape. The significance and manner of setting the individual bits of the Result Status register 262 is of no significance to the present invention except for the setting of the Operation Complete (OC) bit in the Result Status field, as described above. The format of the Result Status field initially, with OC=0, and after being modified by the peripheral device with OC=1, is shown in FIG. 3.

The Swap operation is initiated by setting the Mode register 232 to the Swap state, as shown by the flow diagram of FIG. 19. At the same time the micro control counter 242 is advanced to the MCC=2 state during which the address in the AM1 register is transferred to the IOR register 192 through gate 210, thus providing the address of the Result Status field. During the SC=11 state of the sequence counter 240, when the FCCL level from the port interchange is off, the address in the AM1 register is applied to the data lines $C_{0-23}L$. With the WDFF control flip-flop 246 set to 0, the state of the Mode register 232 is applied to the lines $RQ_{1-4}L$ through the gate 236 and the TCCF control flip-flop 244 is set to 1. At the end of the MCC=3 state of the micro control counter 242, the address in the IOR register 192 is incremented by one and the micro control counter 242 advances to the MCC=4 state.

During the MCC=4 state when the FCCL level goes true, indicating that the address has been accepted by the port interchange, the Mode register 232 is reset to the IDLE state. The incremented address in the register 192 is transferred to the AM1 register in the scratchpad memory 196. The WDFF control flip-flop 246 is set to 1 and the micro control counter 242 advances to MCC=5.

During the SC=11 state, whenever the FCCL level or the WDFF control flip-flop is in the 1 state, the new Result Status field in the register 262 is applied to the data lines $C_{0-23}L$ through the gate 264 for writing into main memory. When the FCCL level goes true, indicating that the data has been accepted, the control flip-flop WDFF 246 is reset to 0 and the micro control counter 242 advances to MCC=6. When FCCL again goes true, indicating that the data from main memory is now available, the TCCF control flip-flop 244 is reset to 0. The data read out of memory onto the data lines $C_{0-23}L$ is gated into the IOR register 192 through the gate 190. The sequence counter is set to SC=12 and the micro control counter is set to MCC=1. This completes the memory Swap operation in which the new Result Status has been stored in memory and the prior Result Status field has been brought from memory into the IOR register 192.

Figure 20:
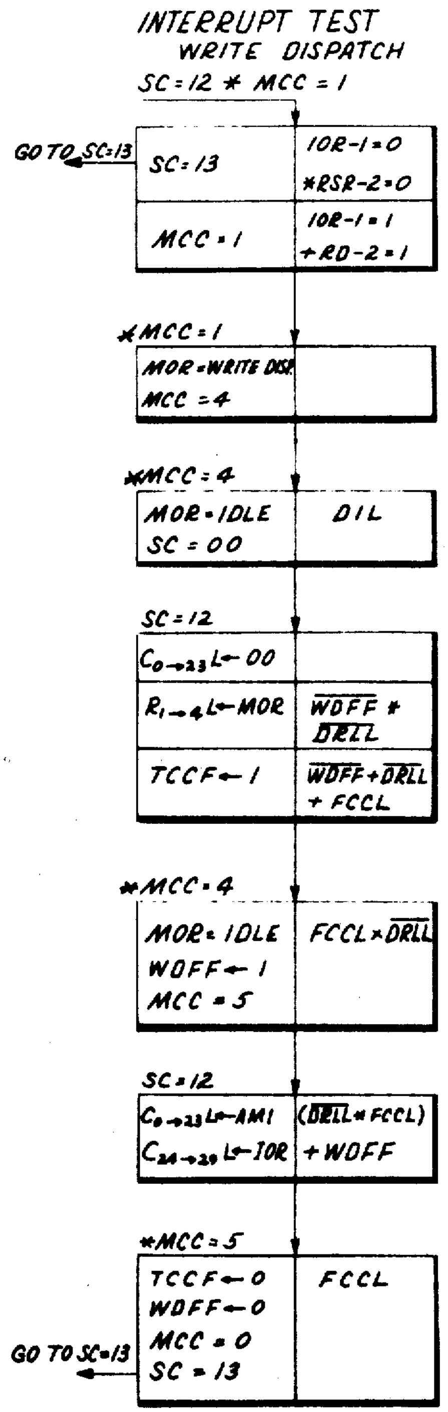

With the sequence counter 240 advanced to the SC=12 state, as shown in the flow diagram of FIG. 20, a test is made on the Interrupt Request (IR) bit of the Result Status field stored in the IOR register 192 at IOR–1 and a test is made of the exception indicating bit in the Result Status register 262 at RSR–2 to determine if any exception condition was set by the peripheral device. If both bits are 0, indicating no interrupt of the processor is required at this time, the sequence counter is immediately set to the SC=13 state. If either bit has been set to 1, the micro control counter 242 is advanced to MCC=1. The Mode register 232 is then set to the Write Dispatch state so as to initiate a dispatch message signaling an Interrupt condition to the processor. With the micro control counter 242 advanced to the MCC=4, if a Dispatch Interrupt level DIL is received from the port interchange, the Mode register 232 is reset to IDLE and the sequence counter 240 is immediately returned to the SC=0 state. Otherwise during the SC=12 state, a 0 level is initially applied to the data lines $C_{0-23}L$ to provide the 00 address for dispatch messages to the port interchange. If the control flip-flop WDFF is set to 0 and the DRLL level from the port interchange is off, indicating that there is no lockout of the Dispatch Register, the Write Dispatch state in the Mode register 232 is gated through the gate 236 to the control lines $RQ_{1-4}L$, signaling a Write Dispatch operation to the port interchange. Also when the FCCL level goes true indicating that the address 00 has been accepted by the port interchange, the TCCF control flip-flop 244 is set to 1. When the FCCL level is on, and the DRLL level is off, indicating that there has been no lockout, the Mode register 232 is reset to the IDLE state, the WDFF control flip-flop 246 is set to 1, and the micro control counter 242 is advanced to MCC=5. The Write Dispatch during SC=12 causes the address in the AM + 1 register to be transferred as data back to the port interchange and causes the From Port No. in the Result Status field presently in the IOR register 192, as the result of the prior memory Swap operation during SC=11, to be applied to the data lines $C_{24-29}L$ for storage as part of the dispatch message in the Dispatch register 132 (see FIG. 8A) of the port interchange. Both these conditions occur during the SC=12 state whenever the DRLL level is off and the FCCL level is true, or the WDFF level is true.

During the MCC=5 state of the micro control counter 242, the TCCF control flip-flop 244 is reset to 0 when the FCCL level goes true, indicating that the data has been accepted by the port interchange. Also the WDFF control flip-flop 246 is reset to 0, the sequence counter 240 is advanced to the SC=13 state and the micro control counter 242 is reset to 0, thus completing the Write Dispatch operation in response to an Interrupt Request from the processor of an exception condition from the peripheral device.

Figure 21:
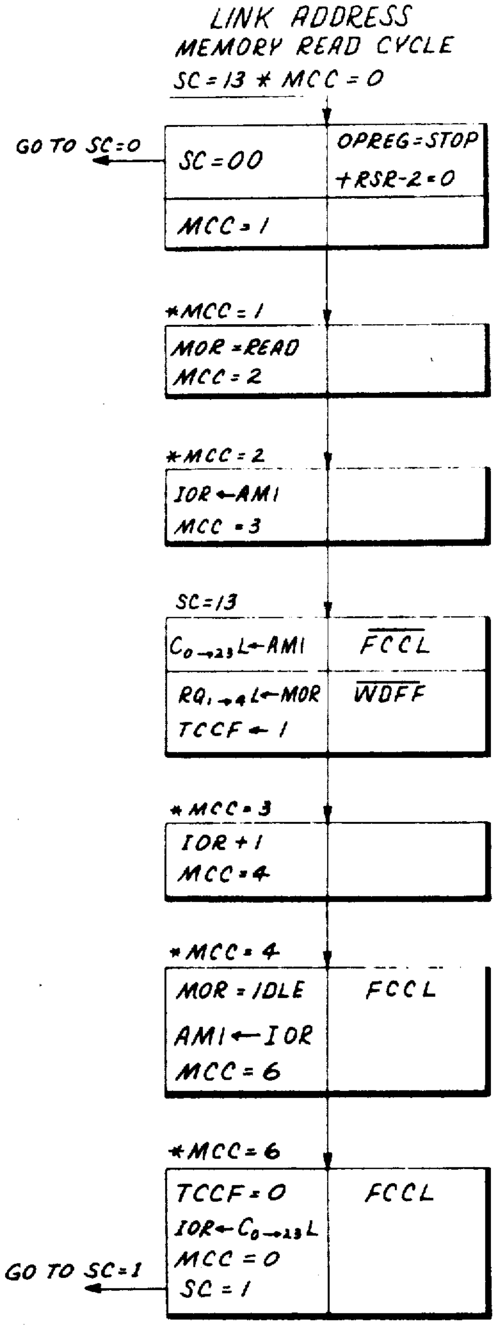

Referring to the flow diagram of FIG. 21, the final operational step by the I/O control unit in executing a particular I/O descriptor, is to obtain the link address from the descriptor, which is the address of the Result Status field of the next input/output descriptor in a linked chain of input/output descriptors. If the OP code command is a Stop command, or if the Result Status field in the RSR register 262 indicates an exception condition, the chaining sequence is terminated, and the sequence counter 240 is reset to 0, placing the I/O control back in the idling state awaiting another Dispatch Interrupt. If neither a Stop command nor an exception condition has occurred, the micro control counter 242 is advanced to the MCC=1 state. During the successive steps of the flow, as shown by FIG. 21, a normal memory Read cycle is performed using the address in the AM1 + 1 register of the scratchpad memory 196. This results in the reading out of the link address from main memory into the IOR register 192. On completion of the memory cycle, the sequence counter 240 is reset to the SC=1 state and the micro control counter 242 is reset to 0. The above-described operation of the input/output control unit is then repeated on the next descriptor in the chain without intervention of the processor or other port device.

Figure 22:
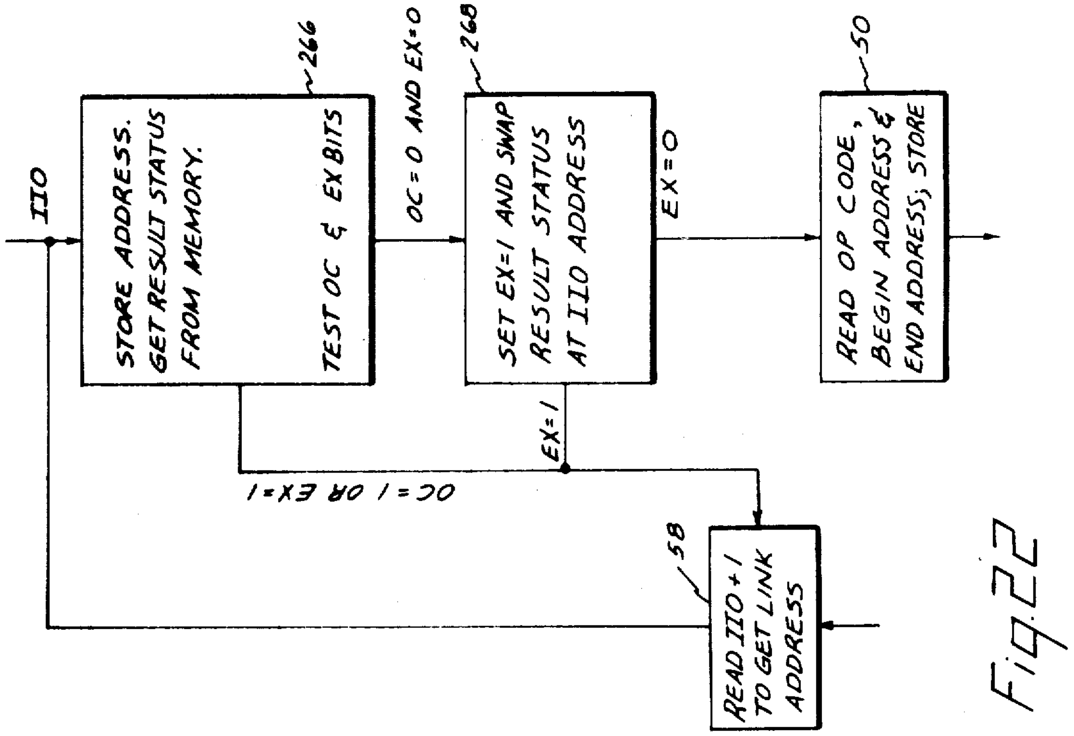
FIG. 22 is a flow diagram of a modification to the flow of FIG. 4.

In some circumstances, such as in the use of disk files for peripheral devices, it is desirable for a number of identical I/O controls to each be able to service any one of a number of peripheral devices through an exchange 41, as shown in FIG. 1. Such an exchange is described in detail in U.S. Pat. No. 3,638,198. With such an arrangement, a number of identical I/O control units can share a common chain of linked descriptors. Since any I/O descriptor in the chain may be executed by any of the I/O control units, under such circumstances rather than have an I/O control unit pause when it finds a descriptor in which the Operation Complete bit is turned on, the I/O control unit proceeds to the next descriptor in the chain using the link address. The operation of an I/O control unit arranged to service any one of a number of peripheral devices through an exchange is summarized in the diagram of FIG. 22.

Assuming a dispatch message has been sent to the particular I/O control unit through the port interchange, in the manner set forth in blocks 42, 44, and 46 of FIG. 4, the IIO address pointing to the Result Status field of the I/O descriptor is received by the I/O control unit. As indicated at 266 in FIG. 22, the I/O control unit stores this address and uses the address to fetch the Result Status field of the I/O descriptor from memory. The I/O control unit then tests both the OC bit and the EXception bit in the Result Status field. The OC bit, as described above, indicates whether the operation called for by the descriptor has already been performed. The EX bit indicates whether or not the descriptor is in the process of being performed by another I/O control unit, the EX bit being used as a lock bit. If both bits are 0, indicating that the operation has not been completed and the descriptor is not locked, as indicated at 268 in FIG. 22, the EX bit is set to 1 and a Memory Swap operation on the Result Status field in the descriptor is performed. This results in the Result Status field in memory being modified so that the EX bit is set to 1, indicating a locked condition in the event any other I/O control unit attempts to execute that same descriptor. At the same time, the unmodified Result Status field in memory at the start of the Memory Swap operation is sent to the I/O control unit where the test on the EX bit is repeated to determine if another I/O control unit has already initiated the same I/O operation. If the EX bit is still 0, the I/O control unit then proceeds to read out the OP code, the Begin address and End address in the same manner as described in block 50 of FIG. 4.

If initially either the OC bit or the EX bit is 1, the Link address of the I/O descriptor pointing to the next descriptor, is read by the I/O control unit from memory in the same manner as indicated at 58 in FIG. 4. Also, after the Memory Swap operation, if the EX bit is 1, indicating that the descriptor has been locked, the I/O control similarly proceeds to get the Link address which points to the next descriptor in the chain.

Modification to the control logic of the control circuit 238 (see FIG. 9) to implement the modification described above is shown in the logic flow diagrams of FIG. 23. The SC=1 state of the sequence counter 240 operates in identical manner as described above in connection with FIG. 12 to fetch the Result Status field of the descriptor from memory and store it in the IOR register 192. The I/O control unit then goes into the SC=16 state at the completion of the SC=1 operation.

Figure 23:
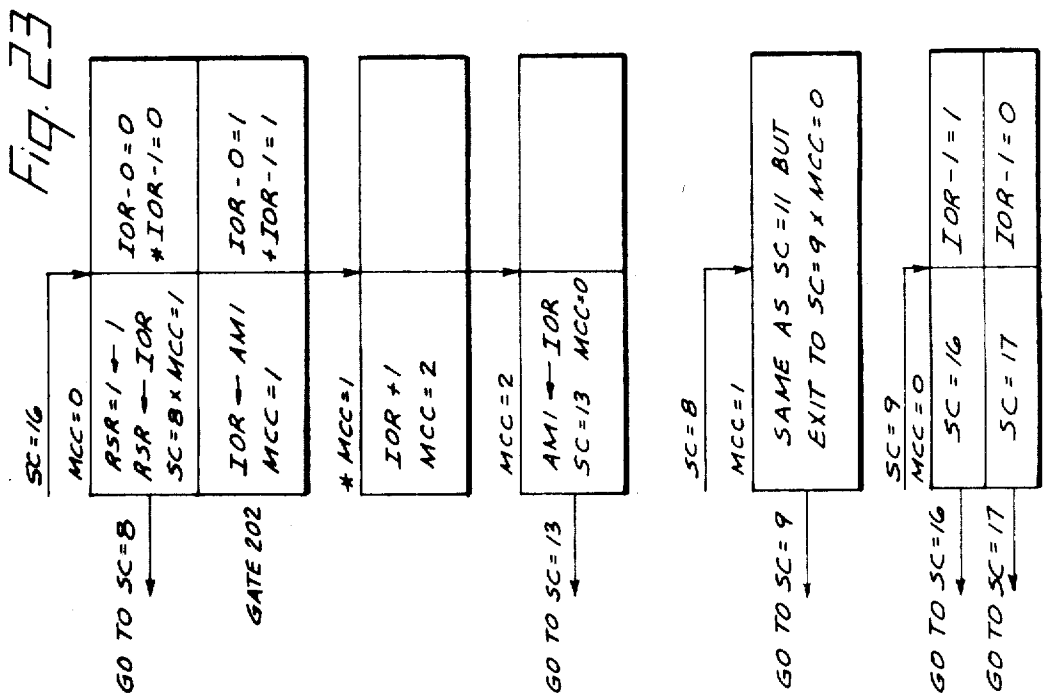
FIG. 23 is a logical flow diagram of the operation of the control logic for the modifications of FIG. 22.

As shown in FIG. 23, the SC=16 state is modified from that previously described in connection with FIG. 13. Specifically, if the first two bits in the IOR register, namely IOR-0 and IOR-1 are both 0, corresponding to the OC=0 and the EX=0 condition, the Result Status field is transferred from the IOR register to the RSR register 262 through a gate 270. See FIG. 9A. At the same time, the second bit position in the RSR register 262, corresponding to the EX bit position of the Result Status field, is set to 1. The sequence counter 240 is set to SC=8, and the micro-control counter 242 is set to MCC=1.

During the SC=8 state, a Memory Swap operation is performed in the same manner as during the SC=11 state described in detail in FIG. 19. The only difference with the SC=11 state is that during the SC=8 state the control exits to the SC=9 state at the completion of the SC=8 operation. Thus during the Memory Swap operation, the Result Status field in the RSR register 262 is returned to the Result Status field of the descriptor in main memory, whereas the Result Status field as it is present in memory is brought from main memory into the IOR register 192.

During the SC=9 state of the sequence counter 240, the EX bit is again tested in the IOR register. If IOR–1=1, the operation exits back to the SC=16 state. If the IOR–1=0, the sequence counter is set to the SC=17 state. Operation then continues, in identical fashion as shown in FIG. 13, through the SC=17, SC=18, SC=19, and back to the SC=1 state.

Returning to the SC=16 state described in connection with the flow diagram of FIG. 23, if either the OC bit or the EX bit is 1, indicating to the I/O control unit that it should go on to the next descriptor in the chain, the IIO address in the AM1 register is transferred to the IOR register through the gate 202 and the micro control counter 242 is advanced to the MCC=1 state. The address in the IOR register is then incremented by 1 to the address of the Link address field of the descriptor in main memory by IOR+1 circuit 251. During MCC=2, this incremented address is then returned to the AM1 register and operation exits to the SC=13 state of the sequence counter. Operation during the SC=13 state is described in detail in connection with FIG. 21 in which the Link Address field of the descriptor stored in memory is transferred to the IOR register in the control unit.

One of the advantages of the above arrangements is that the linked chain of input/output descriptors can be linked in a closed loop, that is, a link address can point back to a previous descriptor in the chain. By testing the Operation Complete bit in the Result Status field, input/output operations between a particular peripheral device and a buffer area in memory can be repeated indefinitely without intervention of the processor. Whenever a descriptor is encountered in the chain in which the buffer area is not available, as indicated by the Operation Complete bit being set to 1, the input/output control unit may be arranged either to skip to the next descriptor or may be arranged to pause for a fixed period of time and then retest the Operation Complete bit. If the Operation Complete bit is turned off, indicating that the buffer area is again available, the execution of the input/output descriptor goes forward and the chaining operation continues on to the next input/output descriptor in the chain. The chain of descriptors can be altered at any point in order to add or to service completed operations. Completed operations need not be removed from the chain.

The Interrupt Request bit in the Result Status field provides a means by which the input/output control unit can determine at the completion of an input/output operation whether or not an Interrupt is to be sent to the processor or any other port device. The Interrupt Request bit in the Result Status field can be modified in main memory by the software executed by the processor at any time while the input/output operation is being executed. Thus the decision to request an interrupt of the processor at the completion of an input/output operation can be delayed until one clock time prior to the time the input/output operation is completed. At the same time that the processor sets the Interrupt Request bit in the Result Status field, it can examine the OC bit to see if the operation may have already been completed. If so, the interrupt is not needed and is not serviced.

By associating the Result Status field with the descriptor rather than using a fixed location in memory or a predetermined register, multiple descriptors can be assigned to the same peripheral device and one controller is free to service a number of like devices. Errors can be reported without immediate interrupt of a processor to service the error, but the I/O control unit can go on to the next descriptor in the chain.

What is claimed is:

1. Control apparatus for transferring binary coded information between an input/output unit and an addressable memory in response to input/output descriptors stored in the memory, each input/output descriptor specifying an input/output operation and the address of a buffer area in memory, the control apparatus comprising accessing means responsive to an initiating signal for fetching at least a portion of a first input/output descriptor from memory, means including time delay means responsive to a first bit condition of said descriptor portion as fetched from memory by said accessing means for activating said accessing means to again fetch said same portion of said first descriptor from the memory after a predetermined time delay interval, and means responsive to a second bit condition of said descriptor portion when fetched from memory initiating transfer of information between the input/output unit and the buffer area in memory identified by said first input/output descriptor.

2. Apparatus as defined in claim 1 further comprising means indicating when the initiated transfer of information is completed, means setting said portion of the first input/output descriptor in memory to said first bit condition, means in response to an indication by said means indicating when the transfer operation is complete, and means fetching at least a portion of a second input/output descriptor from an address location in memory specified by the first input/output descriptor in response to an indication by said means indicating when the transfer operation is complete.

3. Apparatus as defined in claim 2 further including means storing the address of said descriptor portion in a predetermined location in memory in response to a predetermined bit condition when present in said descriptor portion of the first descriptor.

4. In a digital computer system having a processor, a main memory, a plurality of input/output devices, and control means for controlling transfer of data between memory and the processor and between memory and the input/output devices, a method of transferring data between an input/output device and memory comprising the steps of:

storing a plurality of input/output descriptors in memory, each descriptor having coded bits indicating a particular operation, the address of a buffer area in memory, a group of status and control bits including an operation complete bit and interrupt request bit, on command from the processor initiating an input/output operation by fetching at least a portion of a first descriptor containing the operation complete bit from a location in memory identified by the processor, testing the operation complete bit, in response to a first condition of the operation complete bit, repeatedly fetching from memory and testing the operation complete bit in said first descriptor portion at predetermined time intervals, in response to a second condition of the operation complete bit when fetched from memory, executing the operation specified by the descriptor for transferring data between an input/output device and the specified buffer area in memory, and on completion of the data transfer, setting the operation complete bit in the descriptor in memory to said first condition.

5. The method of claim 4 further comprising the steps of:

at completion of the transfer operation, storing as part of the first descriptor the address in memory of the last data transferred between memory and the input/output device.

6. The method of claim 4 further comprising the steps of:

when the data transfer is completed, fetching from memory at least a portion of the first descriptor including the interrupt request bit, testing the interrupt request bit, in response to a first condition of the interrupt request bit, providing an indication to the processor that the operation specified by the first descriptor has been completed.

7. The method of claim 6 further comprising the steps of:

when the data transfer is completed, initiating another input/output operation by fetching at least a portion of a second descriptor from memory without intervention of the processor.

8. The method of claim 7 wherein:

the step of fetching at least a portion of a second descriptor includes fetching the second descriptor from an address identified by a portion of the first descriptor.

9. Apparatus for controlling transfer of data between an input/output device and memory, comprising:

means storing a plurality of digitally coded input/output descriptors, each descriptor having a status field for storing a plurality of control bits, an operation field for storing the input/output operation to be performed, a buffer address field identifying a buffer area in memory, and a link address field identifying the location of another input/output descriptor, accessing means for fetching the status field of a first descriptor from the descriptor storing means, means responsive to a first coded condition of the status field fetched from memory by the first accessing means for fetching the same status field at periodic time intervals as long as the first coded condition is present, and means responsive to a second condition of the status field when it is fetched from memory for executing the transfer operation specified by the operation field using the buffer area specified by the address field of the first descriptor.

10. Apparatus defined in claim 9 further comprising:

means indicating when the transfer operation is completed, and means responsive to said indicating means for setting the status field of the first descriptor to said first coded condition in the descriptor storing means when the transfer operation is completed.

11. Apparatus as defined in claim 10 further comprising:

means responsive to said indicating means for activating said accessing means to fetch the link address field of the first descriptor from the descriptor storing means when the transfer operation is complete, and means responsive to the link address for fetching the status field of the next descriptor at said link address location in memory.

12. A digital computer system comprising a main memory, a plurality of input/output devices for storing digital data, a plurality of input/output control units for controlling the transfer of digital data between main memory and the input/output devices, at least one processor, a memory exchange for controlling access to memory by the processor and the input/output control units, each input/output control unit having associated therewith and stored in the main memory a plurality of input/output descriptors each having an operation code, a beginning address of a buffer area in main memory, a result status field, and a link address pointing to another input/output descriptor, means in the memory exchange responsive to a group of signals from the processor for initiating an input/output operation by a designated control unit, the control unit including means reading out the result status field of a descriptor from main memory in response to said initiating means and storing it in the input/output control unit, means responsive to the operation complete bit in the result status field read out of memory when the bit is off for reading out the operation code and the beginning address from the associated descriptor in main memory and storing them in the input/output control, means responsive to the operation code for initiating an input/output data transfer operation between the input/output device associated with the designated control unit and main memory through the exchange starting at the beginning address in main memory, means generating a termination signal when the data transfer operation is completed, means responsive to the termination signal for reading the link address from the associated descriptor in main memory and storing it in the control unit, and means in the control unit reading out the result status field of the descriptor at the link address location in main memory.

13. Apparatus of claim 12 further comprising means in the control unit responsive to the operation complete bit in the result status field read out of memory when the bit is on for repeatedly reading out the result status field at intervals until the operation complete bit is off.

14. Apparatus of claim 12 further comprising means in the control unit responsive to the operation complete bit in the result status field read out of memory when the bit is on for reading out the link address from the associated descriptor and storing it in the control unit, and means for reading out the result status field of the descriptor at the link address location in memory.

15. Apparatus of claim 12 further including means responsive to said termination signal for again reading out the result status field of the descriptor from memory, and means writing into the same descriptor location in memory a new result status field in which the operation complete bit is on.

16. Apparatus as defined in claim 15 wherein the result status field includes an interrupt request bit, means in the control unit responsive to the interrupt request bit when it is on for signalling the processor that the data transfer operation is completed.

17. The method of controlling the transfer of data between one or more peripheral devices and the working memory of a digital computer system having a processor and at least one peripheral control unit sharing said memory, the method comprising the steps of:

storing a plurality of descriptors in main memory, each descriptor specifying an operation for transferring data between memory and a peripheral device, a buffer area in main memory, an operation complete flag indicating if the operation is completed or not completed, and a link address to another descriptor;

initiating the read-out of a first one of the descriptors by the processor from memory to a peripheral control unit;

executing in the control unit the operation specified by the descriptor;

on completion of the execution of the operation, reading out a second one of the descriptors from the link address location in memory specified by the first descriptor to the peripheral control unit without intervention of the processor; and repeating the steps of executing the operation of the descriptor and reading out the next descriptor from the link address location in memory.

18. The method of claim 17 further including the steps of:

at the completion of the execution of each descriptor operation, setting the flag in the corresponding descriptor in memory to indicate the operation is completed.

19. The method of claim 18 further including the steps of:

on reading out each descriptor from memory to the control unit, testing the operation complete flag in the descriptor when the flag indicates the operation is completed, temporarily suspending execution of the descriptor operation and periodically reading out and testing the flag;

when the flag indicates the operation is not completed, proceeding with the execution of the specified operation.

20. The method of claim 18 further including the steps of:

on reading out each descriptor from memory to the control unit, testing the operation complete flag in the descriptor;

when the flag indicates the operation is completed, reading out the next descriptor from the link address location specified by the current descriptor.

21. The method of claim 17 further including the steps of:

storing with each descriptor in memory an interrupt request flag indicating if an interrupt of the processor is requested after execution of the descriptor operation;

at the completion of the execution of each operation specified by a descriptor, reading out and testing the interrupt request flag from the same descriptor in memory;

if the interrupt request flag indicates an interrupt of the processor is requested, dispatching an interrupt signal from the control unit to the processor.

22. The method of claim 17 further including the steps of:

at the completion of the execution of each descriptor operation, generating a result status indication of the operation performed;

storing the result status indication with the corresponding descriptor in memory.

23. The method of claim 17 further including the steps of:

at the completion of the execution of each descriptor operation, storing the final address of the buffer area in memory, used in executing the operation specified by the descriptor, with the corresponding descriptor in memory.

* * * * *